(12) United States Patent
Ozaki et al.

(10) Patent No.: US 8,843,613 B2
(45) Date of Patent: Sep. 23, 2014

(54) INFORMATION PROCESSING SYSTEM, AND MANAGEMENT METHOD FOR STORAGE MONITORING SERVER

(75) Inventors: Takeshi Ozaki, Yokohama (JP); Hideo Ohata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1200 days.

(21) Appl. No.: 12/642,547

(22) Filed: Dec. 18, 2009

(65) Prior Publication Data

US 2011/0099268 A1    Apr. 28, 2011

(51) Int. Cl.
*G06F 15/173*    (2006.01)
*G06F 11/34*    (2006.01)

(52) U.S. Cl.
CPC ........ *G06F 11/3485* (2013.01); *G06F 11/3495* (2013.01)
USPC ........... 709/224; 709/247; 709/230; 709/232; 709/228; 709/229; 709/231; 709/234

(58) Field of Classification Search
USPC .......................... 709/224, 223, 201, 202, 203
See application file for complete search history.

(56) References Cited

U.S. PATENT DOCUMENTS

| | | | |
|---|---|---|---|
| 7,143,008 B2 | 11/2006 | Ochi et al. | |
| 7,277,821 B2 | 10/2007 | Ochi et al. | |
| 8,248,928 B1 * | 8/2012 | Wang et al. | 370/230 |
| 2005/0160133 A1 * | 7/2005 | Greenlee et al. | 709/200 |
| 2007/0294562 A1 | 12/2007 | Takamatsu et al. | |
| 2009/0150718 A1 * | 6/2009 | Park et al. | 714/4 |
| 2011/0040877 A1 * | 2/2011 | Foisy | 709/226 |

FOREIGN PATENT DOCUMENTS

| | | | |
|---|---|---|---|
| JP | 2001-144761 A | 5/2001 | |
| JP | 2006-107126 A | 4/2006 | |
| JP | 2007-299161 A | 11/2007 | |

OTHER PUBLICATIONS

Japan Patent Office Notification of Reasons for Rejection on application 2009-245753 mailed May 29, 2012; 3 pages.

* cited by examiner

*Primary Examiner* — Lan-Dai T Truong
(74) *Attorney, Agent, or Firm* — Foley & Lardner LLP

(57) ABSTRACT

An information processing system 1 configured to include a plurality of storage monitoring servers 119 that manage performance information related to performance in a storage system 20 including a storage apparatus 236 and a host server 111 that accesses the storage apparatus 236 and monitoring information to be monitored in the storage system 20. The storage monitoring servers 119 acquire performance information and monitoring information to determine the storage monitoring server 119 to be responsible for managing individual performance information and individual monitoring information based on the acquired performance information and monitoring information, and transfers, according to a distribution plan determined by the storage monitoring servers 119, individual performance information and individual monitoring information to a storage monitoring server 119 responsible for managing individual performance information and individual monitoring information.

14 Claims, 34 Drawing Sheets

APPLICATION – DEVICE FILE CORRESPONDENCE TABLE 320

| APPLICATION (3201) | DEVICE FILE (3202) |
|---|---|
| AP A | DEV A |
| AP A | DEV B |
| AP B | DEV C |
| AP B | DEV D |
| AP F | DEV E |

FIG. 3A

PORT – PORT CORRESPONDENCE TABLE 330

| HBA PORT (3301) | STORAGE PORT (3302) | HBA PORT – SWITCH PORT – STORAGE PORT (3303) |
|---|---|---|
| PORT A | PORT X | PORT A,J,R,X |
| PORT B | PORT X | PORT B,J,R,X |
| PORT C | PORT X | PORT C,K,S,X |
| PORT D | PORT X | PORT D,K,S,X |
| PORT E | PORT Y | PORT E,L,T,Y |

FIG. 3B

DEVICE FILE – LOGICAL VOLUME CORRESPONDENCE TABLE 340

| DEVICE FILE (3401) | LOGICAL VOLUME (3402) |
|---|---|
| DEV A | LOGICAL VOLUME A |
| DEV B | LOGICAL VOLUME A |
| DEV C | LOGICAL VOLUME A |
| DEV D | LOGICAL VOLUME A |
| DEV E | LOGICAL VOLUME B |

FIG. 3C

LOGICAL VOLUME – ARRAY GROUP CORRESPONDENCE TABLE 350

| LOGICAL VOLUME | ARRAY GROUP |
|---|---|
| LOGICAL VOLUME A | AG A |
| LOGICAL VOLUME A | AG B |

HOST SERVER-DEVICE FILE CORRESPONDENCE TABLE 360

| HOST SERVER | DEVICE FILE |
|---|---|
| HOST SERVER A | DEV A |
| HOST SERVER B | DEV B |
| HOST SERVER C | DEV C |
| HOST SERVER D | DEV D |
| HOST SERVER E | DEV E |

POERFORMANCE INFORMATION TABLE 303

| RESOURCE | PERFORMANCE INFORMATION [IOPS] |
|---|---|
| HOST SERVER A | 50 |
| HOST SERVER B | 100 |
| HOST SERVER C | 150 |
| HOST SERVER D | 200 |
| DEV A | 50 |
| DEV B | 100 |
| DEV C | 150 |
| DEV D | 200 |
| PORT A | 50 |
| PORT B | 100 |
| PORT C | 150 |
| PORT D | 200 |
| PORT J | 200 |
| PORT K | 200 |
| PORT S | 200 |
| PORT R | 200 |
| PORT X | 200 |
| LOGICAL VOLUME A | 300 |
| AG A | 300 |
| HOST SERVER E | 50 |
| DEV E | 50 |
| PORT E | 50 |
| PORT L | 50 |
| PORT T | 50 |
| PORT Y | 50 |
| LOGICAL VOLUME B | 50 |
| AG B | 50 |

3031 = RESOURCE column; 3032 = PERFORMANCE INFORMATION [IOPS] column

FIG. 4

PATH TABLE 305

| I/O PATH | RESOURCE |
|---|---|
| I/O PATH A | HOST SERVER A, DEV A, PORT A, PORT J, PORT R, PORT X, LOGICAL VOLUME A, AG A |
| I/O PATH B | HOST SERVER B, DEV B, PORT B, PORT J, PORT R, PORT X, LOGICAL VOLUME A, AG A |
| I/O PATH C | HOST SERVER C, DEV C, PORT C, PORT K, PORT S, PORT X, LOGICAL VOLUME A, AG A |
| I/O PATH D | HOST SERVER D, DEV D, PORT D, PORT K, PORT S, PORT X, LOGICAL VOLUME A, AG A |
| I/O PATH E | HOST SERVER E, DEV E, PORT E, PORT L, PORT T, PORT Y, LOGICAL VOLUME B, AG B |

FIG. 5

PATH RELATION TABLE 306

| FUNCTION | RESOURCE |
|---|---|
| CLUSTER | HOST SERVER A, HOST SERVER B |
| VIRTUAL MACHINE | VIRTUAL MACHINE A, VIRTUAL MACHINE B |
| LOAD BALANCING (MULTI-PATH) | DEV V, DEV W, DEV X |
| DEVICE MIGRATION | STORAGE DEVICE T, STORAGE DEVICE U |
| EXTERNALLY CONNECTED STORAGE DEVICE | STORAGE DEVICE Y, STORAGE DEVICE Z |
| IDENTICAL APPLICATION | DEV A, DEV B |

FIG. 8

DISTRIBUTION CONDITION TABLE 313

| THRESHOLD VALUE OF CPU USAGE RATE | THRESHOLD VALUE OF MEMORY USAGE RATE | THRESHOLD VALUE OF DISK USAGE RATE | DISTRIBUTION SERVER NAME |
|---|---|---|---|
| 80% | 70% | 60% | MONITORING SERVER A, MONITORING SERVER B |

COLLECTION FREQUENCY TABLE 304

| RESOURCE (3041) | COLLECTION FREQUENCY (3042) |
|---|---|
| PORT A | 24 |

PATH GROUPING TABLE 310

| GROUP ID (3101) | I/O PATH (3102) | LOAD LEVEL (3103) |
|---|---|---|
| 1 | I/O PATH A, I/O PATH B | 440 |
| 2 | I/O PATH C, I/O PATH D | 420 |
| 3 | I/O PATH E | 48 |

FIG. 17

DISTRIBUTION PLAN TABLE 312

| GROUP ID (3121) | LOAD LEVEL (3122) | MONITORING SERVER OF DISTRIBUTION DESTINATION (3123) |
|---|---|---|
| 1 | 444 | MONITORING SERVER A |
| 2,3 | 468 | MONITORING SERVER B |

FIG. 21

DISTRIBUTION PLAN DISPLAY SCREEN 2300

[EXECUTION BUTTON 2315]

| MONITORING SERVER OF DISTRIBUTION DESTINATION 2311 | I/O 2312 | I/O PATH 2313 | RESOURCE 2314 |
|---|---|---|---|
| MONITORING SERVER A | I/O PATH GROUP 1 | I/O PATH A | HOST SERVER A, DEV A, PORT A, PORT J, PORT R, PORT X, LOGICAL VOLUME A, AG A |
| MONITORING SERVER A | I/O PATH GROUP 1 | I/O PATH B | HOST SERVER B, DEV B, PORT B, PORT J, PORT R, PORT X, LOGICAL VOLUME A, AG A |
| MONITORING SERVER B | I/O PATH GROUP 2 | I/O PATH C | HOST SERVER C, DEV C, PORT C, PORT K, PORT S, PORT X, LOGICAL VOLUME A, AG A |
| MONITORING SERVER B | I/O PATH GROUP 2 | I/O PATH D | HOST SERVER D, DEV D, PORT D, PORT K, PORT S, PORT X, LOGICAL VOLUME A, AG A |
| MONITORING SERVER B | I/O PATH GROUP 3 | I/O PATH E | HOST SERVER E, DEV E, PORT E, PORT L, PORT T, PORT Y, LOGICAL VOLUME B, AG B |

FIG. 23

MONITORING INFORMATION TABLE 318

| MONITORING SERVER OF DISTRIBUTION DESTINATION | I/O PATH | GROUP ID | RESOURCE |
|---|---|---|---|
| MONITORING SERVER A | I/O PATH A | 1 | HOST SERVER A, DEV A, PORT A, PORT J, PORT R, PORT X, LOGICAL VOLUME A, AG A |
| MONITORING SERVER A | I/O PATH B | 1 | HOST SERVER B, DEV B, PORT B, PORT J, PORT R, PORT X, LOGICAL VOLUME A, AG A |
| MONITORING SERVER B | I/O PATH C | 2 | HOST SERVER C, DEV C, PORT C, PORT K, PORT S, PORT X, LOGICAL VOLUME A, AG A |
| MONITORING SERVER B | I/O PATH D | 2 | HOST SERVER D, DEV D, PORT D, PORT K, PORT S, PORT X, LOGICAL VOLUME A, AG A |
| MONITORING SERVER B | I/O PATH E | 3 | HOST SERVER E, DEV E, PORT E, PORT L, PORT T, PORT Y, LOGICAL VOLUME B, AG B |

FIG. 25

DISPLAY CONTENTS TABLE 321

INFORMATION PROCESSING SYSTEM, AND MANAGEMENT METHOD FOR STORAGE MONITORING SERVER

CROSS-REFERENCE TO RELATED APPLICATIONS

The present application claims priority from Japanese Patent Application No. 2009-245753 filed on Oct. 26, 2009, which is herein incorporated by reference.

BACKGROUND OF THE INVENTION

1. Field of the Invention

The present invention relates to an information processing system, and a management method for a storage monitoring server. More specifically, the present invention relates to a technique for providing appropriate load distribution over multiple storage monitoring servers.

2. Description of the Related Art

In a storage network environment configured with the use of a Storage Area Network (SAN) and the like, in order to monitor the performance of a task system, performance information relating to various hardware and software configuring the storage network is comprehensively collected and their correlation and statuses are monitored.

For example, Japanese Patent Application Laid-open Publication No. 2006-107126 discloses that, in a case of collecting/storing performance information on a storage network, in order to ensure that the cause of any degradation in performance of an application is discovered, the collected/stored performance information from components of the storage network including a host server and a storage apparatus is automatically categorized on the basis of whether or not the collected/stored performance information can be used for examining performance degradation of an application; an importance level of the information is determined according to the results of that categorization, a long retention period is set for performance information of high importance and a short retention period is set for performance information of low importance; and corresponding performance information is deleted when the retention period set for each piece of performance information has elapsed.

The load on a monitoring system that monitors a storage system has been increasing as the scale of the storage networks to be monitored grows. Therefore, appropriate load distribution needs to be performed on the hardware configuring the monitoring system as well.

SUMMARY OF THE INVENTION

The present invention has been conceived in light of the above background and it is therefore an object of the present invention to provide an information processing system and a management method for a storage monitoring server capable of performing appropriate load distribution on storage monitoring servers that manage configuration information and performance information of a storage system.

To attain the above object, one aspect of the present invention provides an information processing system configured to include a plurality of storage monitoring servers communicatively coupled to each other that manages performance information, relating to performance in a storage system that includes a storage apparatus and a host server that accesses the storage apparatus, and monitoring information to be monitored in the storage system. The storage monitoring servers each comprise an information collecting unit that acquires the performance information and the monitoring information from a storage system, a distribution plan generator that determines the storage monitoring server to be responsible for managing the individual performance information and the individual monitoring information based on the performance information and the monitoring information acquired, and a distribution execution unit that transfers the individual performance information and the individual monitoring information to the storage monitoring server responsible for managing the individual performance information and the individual monitoring information according to a distribution plan determined by the distribution plan generator.

According to this aspect of the present invention, the storage monitoring server, based on the performance information and monitoring information acquired from the storage system, determines the storage monitoring server that is to be responsible for managing the individual performance information and the individual monitoring information, and automatically transfers the individual performance information and the individual monitoring information to the storage monitoring server that is responsible for respective management. Therefore, the performance information and the monitoring information can be appropriately distributed among each of a plurality of storage monitoring servers to be managed thereby according to the performance information and monitoring information of the storage system, so that the load on individual storage monitoring servers can be appropriately distributed.

Another aspect of the present invention provides an information processing system wherein the monitoring information includes therein information indicative of a configuration of I/O paths in the storage system and I/O path-related information indicating whether or not the I/O paths are similar, the storage monitoring server further includes a path grouping unit that determines a similarity of the I/O paths based on the I/O path-related information and classifies the I/O paths determined to be similar into a same group, and the distribution plan generator determines the storage monitoring server to be responsible for managing the individual performance information and the individual monitoring information in units of the groups classified by the path grouping unit.

In this way, the storage monitoring server classifies similar I/O paths into the same group, and the storage monitoring server responsible for managing the individual performance information and the individual monitoring information is determined in units of the groups. Therefore, the individual storage monitoring servers are responsible for managing similar performance information and monitoring information so that management of the performance information and the monitoring information does not become complicated even after the management of the performance information and the monitoring information is divided among a plurality of storage monitoring servers, and the relation between resources to be monitored on the I/O path can be easily understood so that the management load can be kept low.

Another aspect of the present invention provides an information processing system wherein the I/O path-related information includes at least one of information relating to an application that accesses the storage apparatus using the I/O path, information relating to a cluster of a host server that accesses the storage apparatus using the I/O path, information relating to a virtual machine of a host server that accesses the storage apparatus using the I/O path, information relating to a device file of a host server that accesses the storage apparatus using the I/O path, information relating to a migration function between storage apparatuses coupled to the I/O path, and information relating to an externally coupled storage apparatus of a storage apparatus coupled to the I/O path.

Meanwhile, another aspect of the present invention provides an information processing system wherein the storage monitoring server manages, for each of the groups, loads on the management of the performance information and the monitoring information of the I/O path belonging to each group, and the distribution plan generator determines the storage monitoring server that is responsible for managing each piece of performance information and each piece of monitoring information so that the load on each of the storage monitoring servers is equalized.

In this way, the storage monitoring server manages the load of managing the performance information and monitoring information of the I/O paths belonging to each group, and determines the storage monitoring server that is to be responsible for managing the individual performance information and the individual monitoring information, thereby equalizing the load on each storage monitoring server. Thus, the load on individual storage monitoring servers is more reliably distributed.

Another aspect of the present invention provides an information processing system wherein each storage monitoring server further includes a collection frequency setting unit that receives and stores a setting for frequency of collection of the performance information and the monitoring information on each resource of the storage server, and the distribution plan generator determines the load on each of the storage monitoring servers based on the collection frequency so that the load on each of the storage monitoring server is equalized and determines the storage monitoring server to be responsible for managing each piece of performance information and each piece of monitoring information.

Another aspect of the present invention provides an information processing system wherein each storage monitoring server further includes a distribution condition setting unit that receives a distribution condition that is a condition for determining whether or not the distribution plan is to be generated and a distribution plan generation determination unit that determines whether or not the distribution plan is to be generated according to the distribution plan received, and the distribution plan generator generates the distribution plan when the distribution plan generation determination unit decides to generate the distribution plan.

In this way the storage monitoring server determines whether or not the distribution condition is satisfied and generates a distribution plan only when the distribution condition is satisfied. As a result, a distribution plan is prevented from being generated unnecessarily. At the same time, a distribution plan is reliably generated when necessary, so that the storage monitoring servers can be efficiently operated with load distribution among the storage monitoring servers carried out reliably. The distribution plan condition includes, for example, a threshold value for determining the present load on the storage monitoring servers.

Another aspect of the present invention provides an information processing system wherein the distribution plan generator stores information that specifies storage monitoring servers capable of being responsible for managing the performance information and the monitoring information, and determines the storage monitoring server to be responsible for managing the individual performance information and the individual monitoring information so that the storage monitoring server specified by the information is made responsible for managing the performance information and the monitoring information.

In this way, the storage monitoring server determines, from among applicable storage monitoring servers each capable of being responsible for managing performance information and monitoring information, the specific storage monitoring server to be responsible for managing the performance information and monitoring information. Therefore, for example, a predetermined storage monitoring server can be made responsible for managing performance information and monitoring information.

According to the present invention, it is therefore possible to distribute the load on the storage monitoring servers that manage configuration information and performance information of the storage system in an appropriate manner.

Other problems and their solutions to be disclosed in this specification will become apparent from the following description of exemplary embodiments, with reference to the accompanying drawings.

BRIEF DESCRIPTION OF THE DRAWINGS

FIG. 3A is an example of an application-device file correspondence table 320;

FIG. 3B is an example of a port-port correspondence table 330;

FIG. 3C is an example of a device file-logical volume correspondence table 340;

FIG. 3D is an example of a logical volume-array group correspondence table 350;

FIG. 3E is an example of a host server-device file correspondence table 360;

FIG. 4 is an example of a performance information table 303;

FIG. 5 is an example of a path table 305;

FIG. 8 is an example of a path relation table 306;

FIG. 11 is an example of a distribution condition table 313;

FIG. 17 is an example of a path grouping table 310;

FIG. 21 is a diagram showing an example of a distribution plan table 312;

FIG. 23 is an example of a distribution plan display screen 2300;

FIG. 25 is a diagram showing an example of a monitoring information table 318;

DETAILED DESCRIPTION OF THE INVENTION

Exemplary embodiments of the present invention will now be described in detail with reference to the accompanying drawings.

Figure 1A:
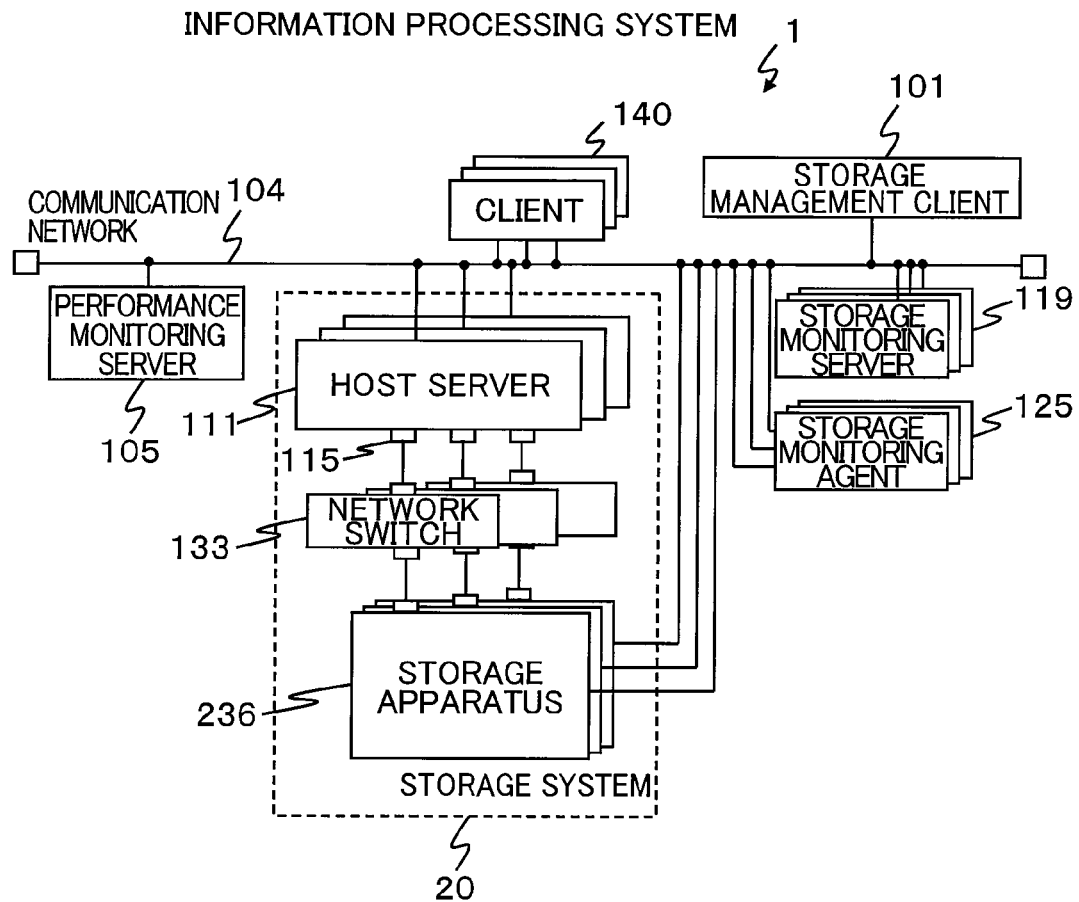
FIG. 1A is a diagram showing an overall configuration of an information processing system 1.

FIG. 1A shows an overall configuration of an information system 1 which is described as one embodiment of the present invention. As shown in FIG. 1A, the information processing system 1 is configured to include one or more of a host server 111, one or more of a storage apparatus 236, one or more of a network switch 133, a communication network 104, one or more of a client 140, a performance monitoring server 105, one or more of a storage monitoring server 119, and one or more of a storage monitoring agent server 125.

The clients 140 are coupled to the host servers 111 via a communication network 104. The host servers 111 are communicatively coupled to the storage apparatuses 236 via network switches 133. The host servers 111, the network switches 133, and the storage apparatuses 236 constitute the storage system 20 used by the clients 140.

Figure 1B:
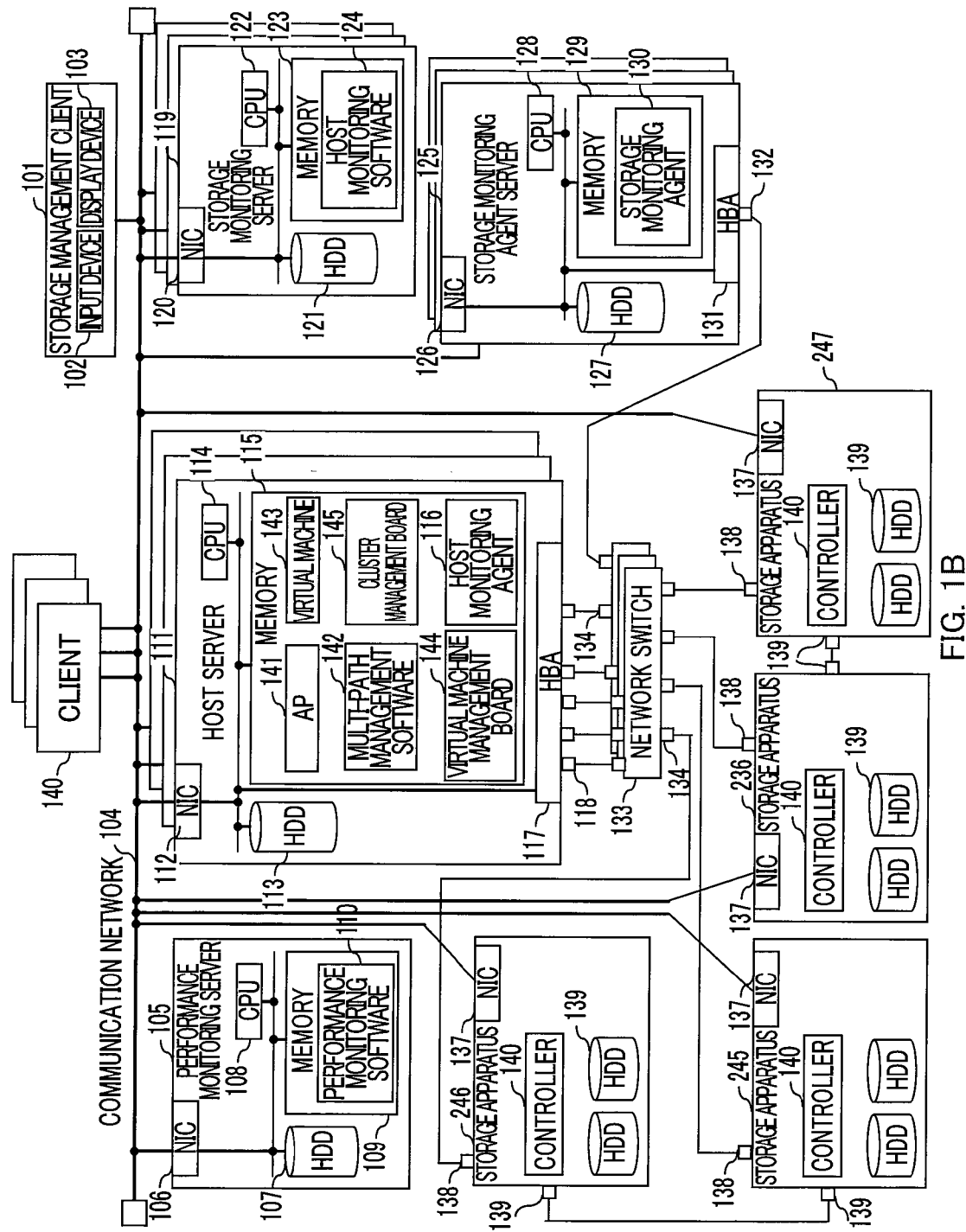
FIG. 1B is a diagram showing a specific configuration of an information processing system 1.

FIG. 1B is a diagram showing a specific configuration (hardware configuration and software configuration) of the information processing system 1. In FIG. 1B, four storage apparatuses 236, 245, 246, 247 are shown as one connective embodiment of the storage apparatus 236. As shown in FIG. 1B, the storage apparatuses 236, 247 are each coupled to the network switch 133 and are communicatively coupled to each other via a communication port 139 as well. In this way, the storage apparatus 247 functions as an externally coupled storage for the storage apparatus 236. Both of the storage apparatuses 245 and 246 are coupled to the communication network 104 and the network switch 133, and are also communicatively coupled to each other via the communication port 139. The storage apparatus 245 and the storage apparatus 246 have a relationship of having data therein mutually migrated, in other words, the physical storage position of data is moved whenever necessary to minimize effects on the task system used by the user.

A client 140 that uses the storage system 20 is, for example, a personal computer, a workstation, or a thin client. The communication network 104 that couples the clients 140 and the host servers 111 is, for example, a local area network (LAN), a wide area network (WAN), the Internet, a public communication network, or a lease line.

The network switches 133 communicatively couple the host servers 111 and the storage apparatus 236 (hereafter referred to as storage apparatus 236 collectively for the storage apparatuses 236, 245, 246, 247 when items common to the storage apparatuses are explained). That is, the storage network is configured by the network switches 133.

The storage network is implemented as, for example, a storage area network (SAN), a local area network (LAN), a wide area network (WAN), or the like. In a case in which the storage network is a SAN, the network switch 133 is a fibre channel switch. In a case in which the storage network is configured as a LAN or a WAN, the network switch 133 is a LAN switch (a switching hub or the like that conforms to 10BASE-T, 100BASE-T, 1000BASE-T(TX)).

The host server 111 includes one or more of a communication port (hereafter referred to as server port 118) for coupling to another device. The storage apparatus 236 includes one or more of a communication port (hereafter referred to as storage port 138) for coupling to another device. The network switch 133 includes one or more of a communication port (hereafter referred to as switch port 135) for coupling to another device.

An operating system and applications (including service applications, system management software, database management applications, and the like) are operated on the host server 111. When a data I/O request (such as a data write request or a data read request) is generated for the storage apparatus 236, the host server 111 transmits (issues) an I/O command (such as a data write command or a data read command) to the storage apparatus 236.

Upon receipt of the I/O command from the host server 111, the storage apparatus 236, according to the I/O command received, controls a storage device configured with the use of a hard disk drive (HDD), solid state drive (SSD), optical recording medium or the like and transmits a notification of data write completion or a notification of data read completion or a data read out from the storage medium over a storage network to the host server 111.

As shown in FIG. 1B, the clients 140, the host servers 111, the storage apparatuses 236, 245, 246, 247, the storage management client 101, the storage monitoring server 119 and the storage monitoring agent server 125 are all communicatively coupled through the communication network 104.

The communication port 132 of the storage monitoring agent server 125 is coupled to the switch port 135 of the network switch 133. Thus, the storage monitoring agent server 125 is enabled to transfer information between the network switches 133 and the storage apparatuses 236, 245, 246, 247.

The storage monitoring agent server 125 communicates with the clients 140, the host servers 111, the network switches 133, and the storage apparatuses 236, 245, 246, 247 and collects, whenever necessary, information relating to the configurations thereof (hereafter referred to as configuration information) as well as information relating to the performances (operating state) (hereafter referred to as performance information) thereof.

A database management system (hereafter abbreviated as DBMS) for managing the collected configuration information and performance information functions in the storage monitoring agent server 125. The storage monitoring agent server 125 provides whenever necessary the collected configuration information and performance information to the storage monitoring server 119 either actively or passively.

The storage monitoring server 119 monitors and controls the components of the storage system 20 (host servers 111, network switches 133, and storage apparatuses 236, 245, 246, 247) based on configuration information and performance information provided from the storage monitoring agent server 125. The DBMS that performs management of configuration information and performance information provided by the storage monitoring agent server 125 functions in the storage monitoring server 119.

The storage management client 101 is an information processing device including a character user interface (CUI) (or a command line interface (CLI) or a graphical user interface (GUI)). The storage management client 101 provides to the system manager or the like a user interface relating to monitoring and controlling the storage system 20 that is performed with the use of the storage monitoring agent server 125 and the storage monitoring server 119.

FIG. 1A shows the storage management client 101, the storage monitoring servers 119, and the storage monitoring agent servers 125, each configured with the use of three independent pieces of hardware. However, the configuration of the hardware is not limited to such. For example, two or more of the three pieces of hardware can be housed in a same housing.

Figure 1C:
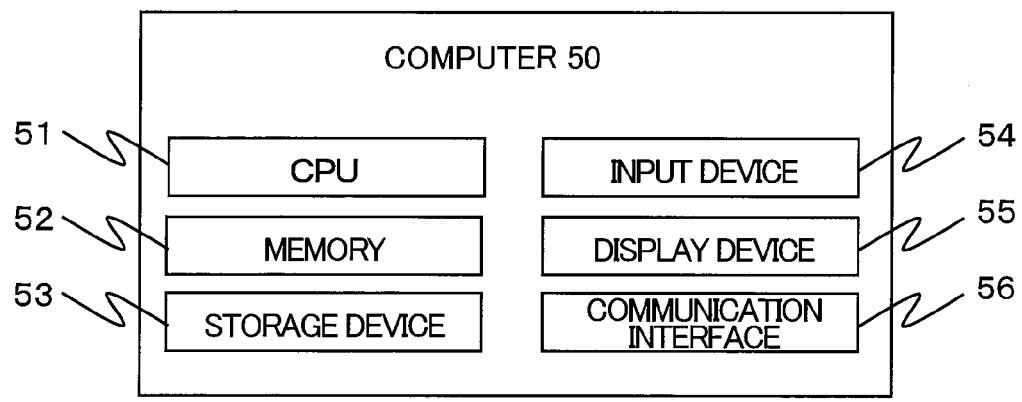
FIG. 1C is a diagram showing an example of a hardware configuration of a computer 50 (information processing device) capable of being used as a host server 111, a performance monitoring server 105, a storage management client 101, a storage monitoring server 119, and a storage monitoring agent server 125.

FIG. 1C shows an example of a hardware configuration of a computer 50 (information processing device) capable of being used as a host server 111, a performance monitoring server 105, a storage management client 101, a storage monitoring server 119, and a storage monitoring agent server 125.

As shown in FIG. 1C, the computer 50 includes a CPU 51, a memory 52 (random access memory (RAM), read only memory (ROM), non-volatile memory (flash memory and the like)), a storage device 53 (hard disk device, semiconductor storage device (SSD), or optical recording medium storage device), an input device 54 (keyboard, mouse, and the like) for accepting an operational input by a user, a display device 55 (liquid crystal monitor, cathode-ray tube display, and the like), and a communication interface 56 (network interface card (NIC), host bus adapter (HBA), and the like) for communicating with other devices.

Figure 1D:
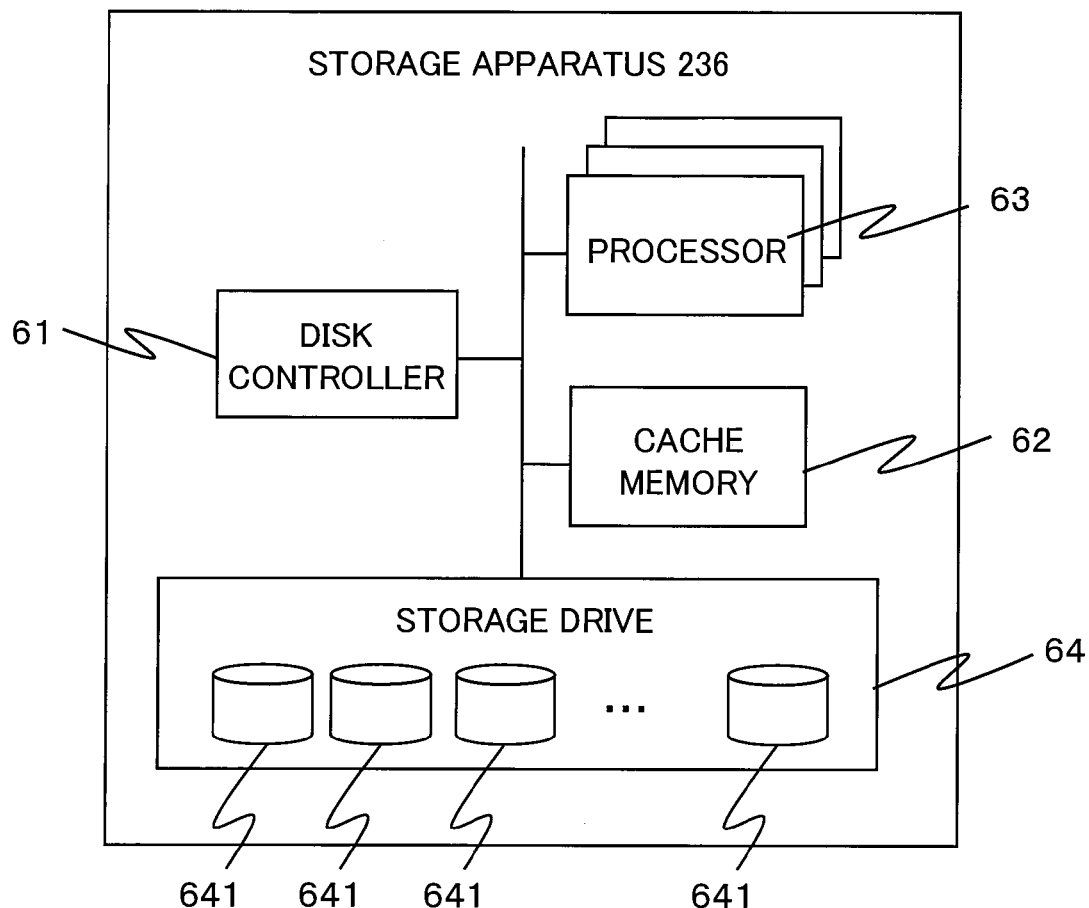
FIG. 1D is a diagram showing an example of a hardware configuration of a storage apparatus 236.

FIG. 1D shows an example of a hardware configuration of a storage apparatus 236. As shown in FIG. 1D, the storage apparatus 236 includes a disk controller 61, a cache memory 62, one or more of a processor 63, and one or more of a storage drive 64. The processor 63 communicates with other devices through the network switch 133. The disk controller 61 is provided with a CPU and a memory and performs I/O processing. Data to be written in and data to be read out from the storage drive 64 are stored in the cache memory 62. The storage drive 64 is provided with a data storage medium (hard disk 641 (physical disk), semiconductor storage device (SSD), and the like).

As an example of a storage apparatus 236 having the above-described configuration there is a disk array apparatus that is a storage apparatus including a plurality of hard disk drives to be controlled by Redundant Arrays of Inexpensive (or Independent) Disks (RAID).

Figure 1E:
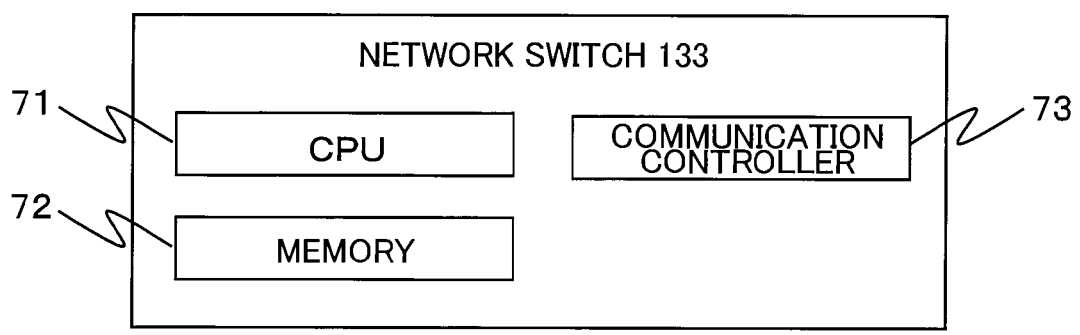
FIG. 1E is a diagram showing an example of a hardware configuration of a network switch 133.

FIG. 1E shows an example of a hardware configuration of a network switch 133. As shown in FIG. 1E, the network switch 133 includes a CPU 71, a memory 72, and a communication controller 73. The CPU 71 implements a program stored in the memory 72 to, for example, implement a function of managing correlation between the switch port 135 of the network switch 133 and the network address of a data transferring device or a data target device, a filtering function, and various security functions. The memory 72 is a RAM, a ROM, or a non-volatile memory. The memory 72 stores therein, for example, programs and firmware for implementing the various functions described above, various tables for managing correlations between transmission source and transmission target such as network addresses, port numbers and the like, and setting information relating to the filtering function and the security function. The communication controller 73 is, for example, a switch controller that controls transfer between switch ports 135 of frames and packets input/output based on source information and target information of frames and packets input/output to/from each switch port 135.

FIG. 1B shows the principal software executed in each component of the information processing system 1. Functions to be provided by each component are implemented by executing the software by a processor in each component.

The application 141 of the host server 111 responds to a processing request from the client 140 and manages data with the use of the storage apparatus 236. The multi-path management software 142 implements functions that perform I/O path load distribution, to be described later, in the storage system 20. The virtual machine management board 144 provides a function of transferring (function of migrating) the virtual machine 143 between a plurality of host servers 111. The cluster management board 145 implements a function of managing a cluster with an objective of distributing load and securing availability between a plurality of other host servers 111. The host monitoring agent 116 acquires configuration information and performance information of the host servers 111 and transfers, as needed, the acquired configuration information and performance information to the source of request such as the storage monitoring server 119.

The storage monitoring software 124 of the storage monitoring server 119 manages (collecting, monitoring, and the like) configuration information and performance information of the storage system 20, generates a distribution plan (distribution policy of processes for managing configuration information and performance information) of the storage monitoring server 119, and implements distribution (executes a distribution plan).

The storage monitoring agent 130 of the storage monitoring agent server 125 acquires configuration information of the storage apparatus 245 via the network switch 133 or the communication network 104.

The performance monitoring software 110 of the performance monitoring server 105 acquires configuration information retained by the storage monitoring software 124 and the like and configuration information or performance information of the host servers 111. The performance monitoring software 110 of the performance monitoring server 105 also outputs (displays) information relating to monitoring and controlling the storage system 20.

The collection of configuration information and performance information from the storage system 20 is performed with the use of, for example, a Simple Network Management Protocol (SNMP). In this case, the host server 111, network switch 133, and the storage apparatus 236 function as, for example, an SNMP agent, and the storage monitoring agent server 125 and the storage monitoring server 119 function as, for example, an SNMP manager. The collection of configuration information or performance information can be implemented using Microsoft (registered trademark) Windows (registered trademark) Management Instrumentation (WMI), Web-Based Enterprise Management (WBEM), Secure Shell (SSH), Storage Management Initiative-Specification (SMI-S) and the like.

The collection and monitoring of the configuration information and performance information of the storage system 20 is performed in, for example, the following way. In other words, in response to a request from the storage monitoring software 124 of the storage monitoring server 119, or at a predetermined timing (scheduled timing, periodical timing, and the like), the host monitoring agent 116 of the host server 111 or the storage monitoring agent 130 of the storage monitoring agent server 125 is activated to acquire configuration information from monitoring target devices for which they are respectively responsible or from software.

The storage monitoring software 124 is activated at a predetermined timing (scheduled timing, periodical timing, and the like) to collect configuration information and performance information from the host monitoring agent 116 or the storage monitoring agent 130, and the storage monitoring server 105, and to store the collected information in a database. It is to be noted that the above-described configuration information and performance information collection method is merely one example thereof, and such collection method can be implemented by various conventional methods.

Configuration Information

As configuration information, there is information indicating relations of resources configuring the storage system 20 (hardware resources or software resources) and information relating to an I/O request made between the host server 111 and the storage apparatus 236 or a path (hereafter referred to as I/O path) used to transmit/receive data that is the target of an I/O request.

Figure 2:
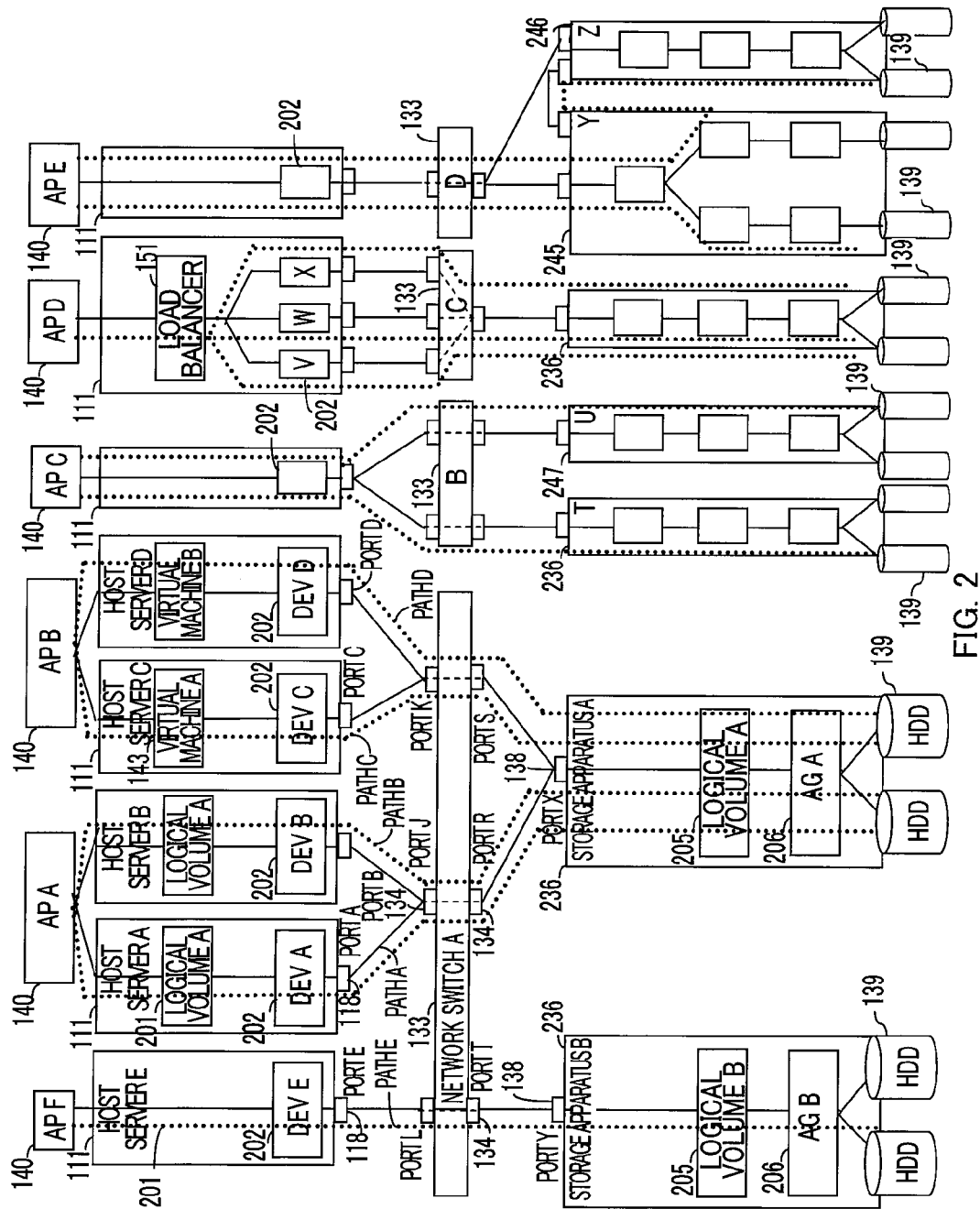
FIG. 2 is a diagram showing a configuration example of a resource in a storage system 20.

FIG. 2 shows a configuration example of resources in the storage system 20. In FIG. 2, the storage system 20 includes resources such as applications 141 ('AP A-F') used by the client 140, server ports 118 ('ports A-E' and others), logical volumes 201 ('logical volume A' and others) in the host server 111, virtual machines 443 ('virtual machine A, B' and others) operated on the host server 111, a load balancer 151 operated on the host server 111, device files 202 ('DEVA-D, V-X') operated on the host servers 111, switch ports 135 ('ports J-L, R-T' and others), storage ports 138 ('ports X, Y' and others), logical volumes 205 ('logical volumes A, B' and others) provided by the storage apparatuses 236, and logical devices 206 (logical device (LDEV) or an array group) ('AG A, B' and others) configuring the logical volumes 205.

FIGS. 3A to 3E show examples of configuration information collected by the storage monitoring agent server 125 and managed by the DBMS of the storage monitoring server 119.

FIG. 3A shows a table that manages the correspondence between the application 141 and the device files 202 (hereafter referred to as application-device file correspondence table 320).

FIG. 3B shows a table that manages the correspondence between the server port 118, the switch port 135, and the storage port 138 (hereafter referred to as port-port correspondence table 330).

FIG. 3C shows a table that manages the correspondence between the device files 202 and the logical volumes 201 (or the logical volumes 205) (hereafter referred to as device file-logical volume correspondence table 340).

FIG. 3D shows a table that manages the correspondence between the logical volumes 201 (or the logical volumes 205) and the logical devices 206 (hereafter referred to as logical volume-array group correspondence table 350).

FIG. 3E shows a table that manages the correspondence between the host servers 111 and the device files 202 (hereafter referred to as host server-device file correspondence table 360).

Besides the information shown in FIGS. 3A-3E, the configuration information managed by the storage monitoring server 119 may further include, for example, other information (information relating to cluster configuration, information relating to the configuration of a virtual machine, information relating to the load distribution (multi-path, load balancer, and the like) setting, information relating to migration performed between devices, information relating to an externally coupled storage apparatuses, and information relating to the device file 202 and application 140 and the device file 202 utilized by the application 140 and the like) retained in constituent components of the storage system 20 (the host server 111, the network switch 133, and the storage apparatus 236).

The above-described application device file correspondence table 320, the port-port correspondence table 330, the device file-logical volume correspondence table 340, the logical volume-array group correspondence table 350, and the host server-device file correspondence table 360 are used as a resource correlation table 325 to be described later with the storage monitoring server 119.

Performance Information

Performance information is information relating to the performance of a resource. Performance information includes, for example, the operating system and the applications 141 operated on the host server 111, the logical volume 201, or number of I/O requests per unit time (I/O per second (IOPS)) processed on the server port 118, number of I/O requests per unit time processed by the switch port 135 on the network switch 133, the storage port 138 of the storage apparatus 236, and number of I/O requests per unit time processed by the logical volume 205 or the logical device 206.

FIG. 4 shows an example of performance information. Performance information is collected by the storage monitoring agent server 125 and managed in the database of the storage management server 119. The table shown in FIG. 4 (hereafter referred to as performance information table 303) is configured with one or more of a record composed of items of resource 3031 to which a resource identifier is set and performance information to which resource performance information (denoted as IOPS) 3032 is set.

I/O path

As shown in FIG. 2, at the time of operating the storage system 20, an I/O path is set that is identified by a combination of the application 141, the logical volume 201, the virtual machine 143, the load balancer 151, the device file 202, the server port 118, the switch port 135, the storage port 138, the logical volume 205, and the logical device 206. The broken lines shown in FIG. 2 show the paths that can be set as an I/O path.

Each I/O path is defined (set) by correlating, for example, the host server 111, the device file 202, the server port 118, the switch port 135, the storage port 138, the logical volume 205, and the logical device 206.

FIG. 5 shows an example of definition information of an I/O path managed as configuration information in the database of the storage management server 119 (hereafter referred to as path table 305). As shown in FIG. 5, the path table 305 is configured with one or more records composed of items of I/O path 3051 to which an identifier of the I/O path is set and resource 3052 to which an identifier of a resource configuring the I/O path is set.

In FIG. 2, the solid lines connecting the resources show that there is some relation between the resources connected by the solid lines at the time of processing an I/O request. For example, in FIG. 2, 'AP A', 'logical volume A' and 'DEV A' of application 141 connected by solid lines means that 'AP A' is capable of transmitting an I/O request to 'DEV A' via 'logical volume A'. Similarly, connection by the solid lines means that 'AP A' is capable of transmitting an I/O request to 'DEV B' via 'logical volume A'.

In FIG. 2, the broken lines connecting the resources show I/O paths. FIG. 2 exemplifies shows a 'path A' that is an I/O path configured by resources 'AP A', 'DEV A', 'port A', 'port J', 'port R', 'port X', 'logical volume A' and 'AG A', and a 'path B' that is an I/O path configured by resources 'AP A', 'DEV B', 'port B', 'port J', 'port R', 'port X', 'logical volume A' and 'AG A'.

In the following description, two I/O paths being 'similar' means that at least a part of the resources configuring the two I/O paths is in common. For example, in FIG. 2, 'path A' and 'path B' have 'AP A', 'port X', 'logical volume A', and 'AGA' in common, which means that they are similar. On the other hand, 'path E', being an I/O path of 'AP F', is not similar to any of the other I/O paths.

In FIG. 2, the 'host sever A' and the 'host server B' configure a cluster. The 'host server E' does not configure a cluster and is a stand-alone operating on its own.

The 'AP B' is an application that operates on the virtual machine 143 implemented by the virtual machine management board 144 of the host server 111, and an I/O request transferred from 'AP B' is sent to the storage apparatus 236 via either of the two virtual machines 143 ('virtual machine A', 'virtual machine B').

The 'AP C' is an application 141 that transmits an I/O request to the storage apparatus 236 coupled to the externally coupled storage apparatus 247, and transmits an I/O request to either storage apparatus 236 or storage apparatus 247.

The 'AP D' is an application 141 that operates on the host server 111 including a load balancer 151 from which a plurality of I/O paths derive.

The 'AP E' is an application 141 that operates on the host server 111 coupled to the storage apparatuses 245, 246 having migration functions. An I/O request transferred from 'AP E' is sent to the 'storage apparatus Y' as the storage apparatus 245 or to the 'storage apparatus Z' as the storage apparatus 246. An I/O request whose destination is 'storage apparatus Z', reaches 'storage apparatus Z' via 'storage apparatus Y'.

Explanation of Functions

Figure 6:
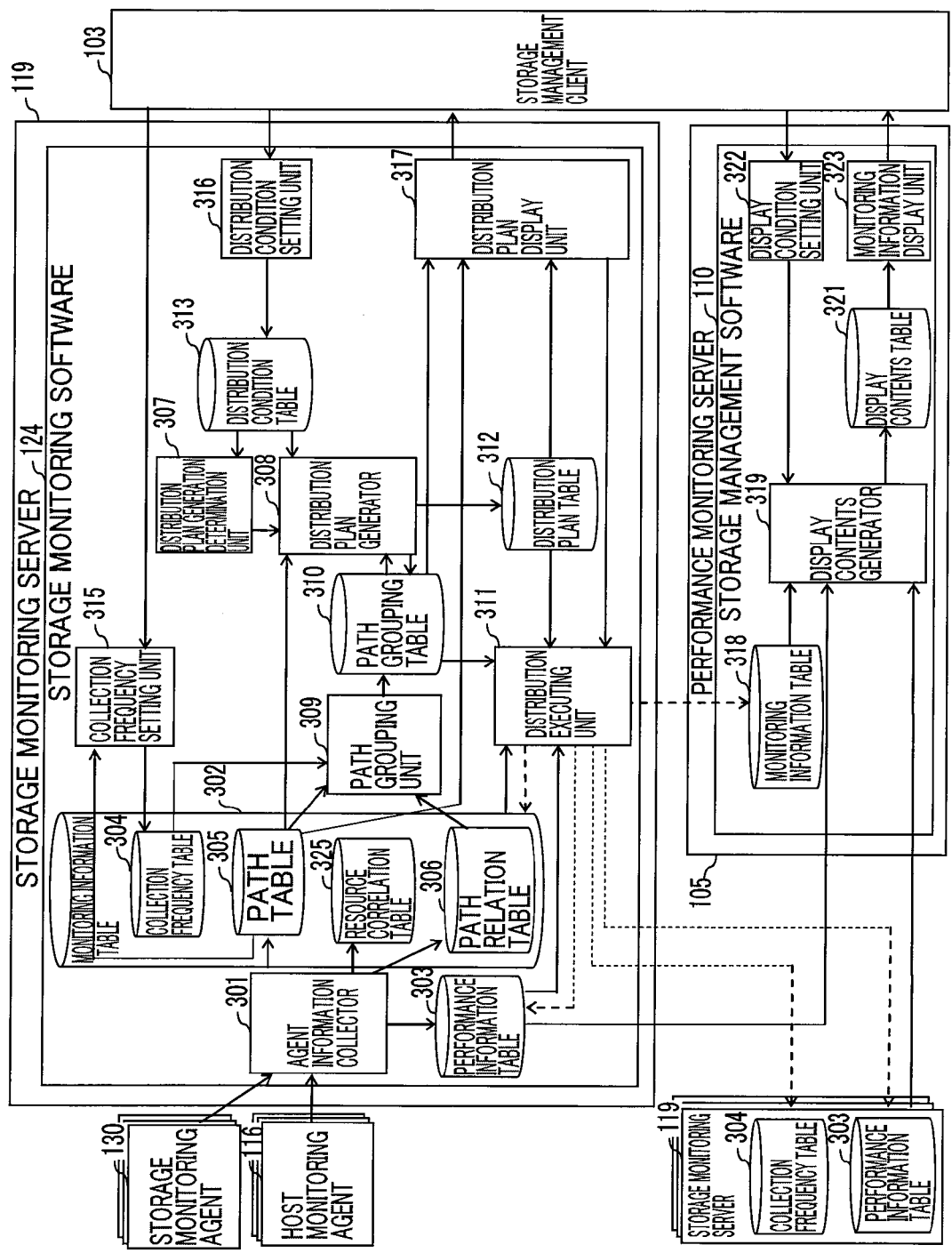
FIG. 6 is a diagram showing principal functions of a storage monitoring server 119 and a performance monitoring server 105.

FIG. 6 shows the principal functions that the storage monitoring server 119 and the performance monitoring server 105 have. In the following description, an explanation will be given of the functions of the storage monitoring server 119 and the performance monitoring server 105 with reference to FIG. 2.

Storage Monitoring Server

As shown in FIG. 6, the storage monitoring server 119 includes functions of the agent information collector 301, the distribution plan generation determination unit 307, the distribution plan generator 308, the distribution executing unit 311, the collection frequency setting unit 315, the distribution condition setting unit 316, and the distribution plan display unit 317. These functions are implemented by the CPU 122 of the storage monitoring server 119 reading and executing a program of the storage monitoring software 124 stored in the memory 123 or the hard disk drive (HDD 121).

As shown in FIG. 6, the memory 123 or the HDD 121 of the storage monitoring server 119 stores therein a performance information table 303 (FIG. 4), a collection frequency table 304 (FIG. 15), a path table 305 (FIG. 5), a path relation table 306 (FIG. 8), a distribution plan table 312 (FIG. 21) and a distribution condition table 313 (FIG. 11). In FIG. 6, the monitoring information table 302 is a table including a collection frequency table 304, a path table 305 and a path relation table 306 as its components. Although not shown in FIG. 6, in addition to these pieces of information the storage monitoring server 119 also manages the above-mentioned configuration information (FIGS. 3A-3E).

The agent information collector 301 acquires configuration information and performance information on the storage system 20 from the storage monitoring agent 130 or the host monitoring agent 116, and registers contents extracted from the acquired configuration information and performance information into the performance information table 303, the resource correlation table 325, the path table 305 and the path relation table 306.

The distribution plan generating unit 308 generates a distribution plan, which is information indicative of how processes for managing the storage system 20 are to be distributed (how the processes are to be divided) among each of the plurality of storage monitoring servers 119.

The distribution plan display unit 317 displays the distribution plan generated by the distribution plan generating unit 308.

The distribution plan generation determination unit 307 determines whether or not the generation of a distribution plan is required. Specifically, the distribution plan determination unit 307 determines whether or not the current load on each of the storage monitoring servers 119 exceeds the threshold value, and in case the current load of each of the storage monitoring servers 119 exceeds the threshold value, determines that the generation of a distribution plan is required.

The collection frequency setting unit 315 acquires the frequency of information collected on each resource input by the user and registers the collection frequency in the collection frequency table 304.

The path grouping unit 309 generates a path grouping table 310 (see FIG. 17) based on the contents of the path table 305 and the path relation table 306.

The distribution condition setting unit 316 acquires the distribution condition of the storage monitoring server 119 and registers it in the distribution condition table 313.

The distribution executing unit 311 transfers data between the storage monitoring servers 119 and sets the contents of the performance information table 303 and the monitoring information table 302 of each storage monitoring server 119, so that the contents of the distribution plan table 312 correspond to each path group in the path grouping table 310. The distribution executing unit 311 also sets the contents of a monitoring information table 318 to correspond to the contents of the distribution plan table 312.

Performance Monitoring Server

As shown in FIG. 6, the performance monitoring server 105 includes each function of the display condition setting unit 322, the monitoring information display unit 323, and the display contents generator 319. These functions are implemented by the CPU 108 of the performance monitoring server 105 through reading out and executing the performance monitoring software 110 stored in the memory 123 or the hard disk drive (HDD 107). As shown in FIG. 6, the memory 123 or the HDD 107 of the performance monitoring server 105 has stored therein the monitoring information table 318 and a display contents table 321.

Figure 27:
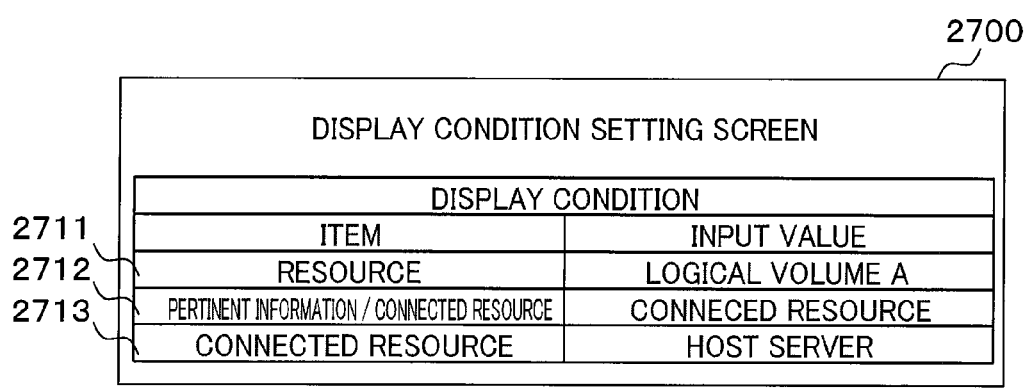
FIG. 27 is an example of a display condition setting screen 2700.

The display condition setting unit 332 acquires display conditions from the user (see FIG. 27). The display contents generator 319 acquires the performance information of the resource corresponding to the acquired display condition from the storage monitoring server 119 retaining the performance information to store in the display contents table 321 (see FIG. 29). The monitoring information display unit 323 outputs the contents of the display contents table 321 to display on the storage management client 103 (see FIG. 31).

Processing

A detailed explanation of the process flow carried out in the information processing system 1 of the present embodiment follows.

Storage Monitoring Server Processing

Figure 7:
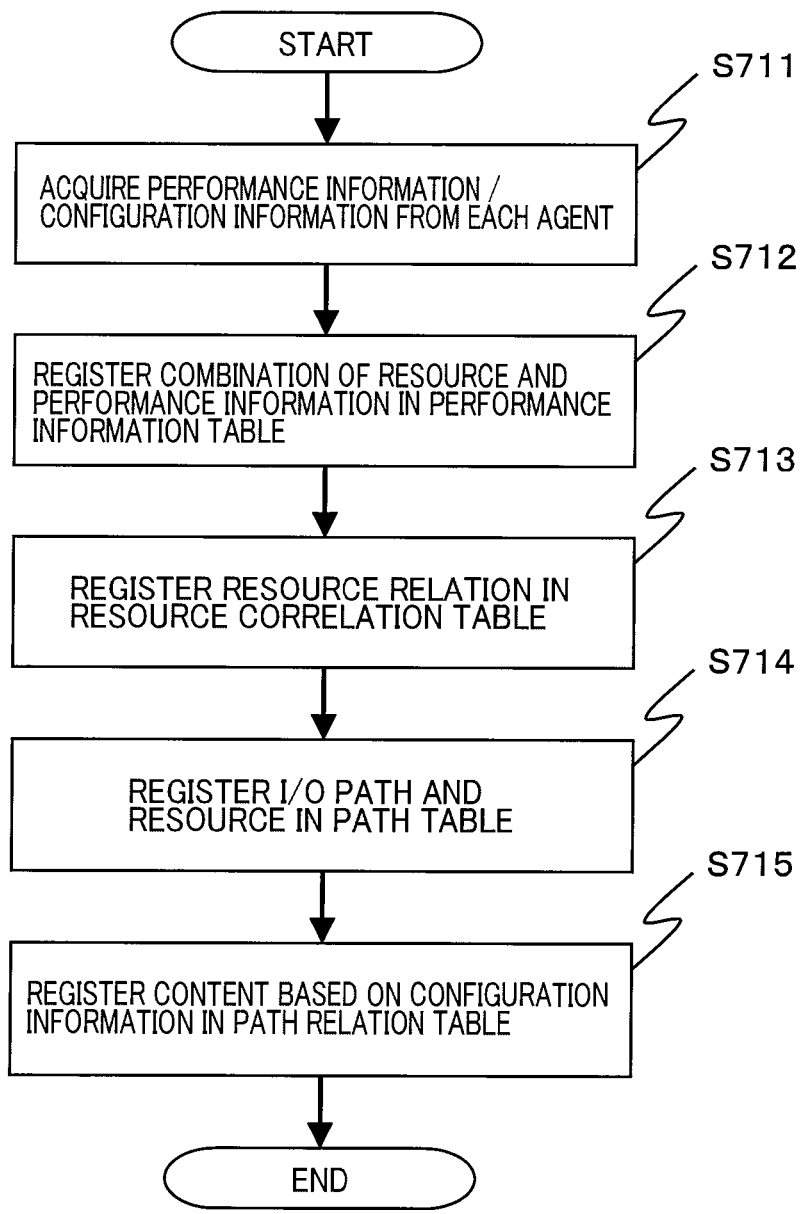
FIG. 7 is a flowchart for explaining an information acquisition process S700.

FIG. 7 is a flowchart for explaining the process performed by the agent information collector 301 of the storage monitoring server 119 (hereafter referred to as information acquisition process S700). An explanation of the information acquisition process S700 with reference to FIG. 7 follows. The information acquisition process S700 is activated at a predetermined timing (scheduled timing, periodical timing, or the like).

First, the agent information collector 301 acquires configuration information and performance information from the storage monitoring agent 130 and the host monitoring agent 116 (S711) and registers in the performance information table 303 performance information 512 of each resource 511 extracted from the acquired configuration information and performance information (S712).

Then, the agent information collector 301 registers in the resource correlation table 325 (FIG. 3A-FIG. 3E) the resource-resource relation extracted from the acquired configuration information (S713). The agent information collector 301 also registers in the path table 305 the configuration of the I/O path based on the contents extracted from the acquired configuration information (S714).

Next, the agent information collector 301 registers contents based on the acquired configuration information in the path relation table 306 (S715). An example of a path relation table 306 is shown in FIG. 8. As shown in FIG. 8, the configuration (resource 3062) of each function 3061 (cluster, virtual machine, load distribution, migration, externally connected storage apparatus, use mode of the device file of an application and the like) (resource 3062) are acquired from the configuration information to be registered in the path relation table 306.

Figure 9:
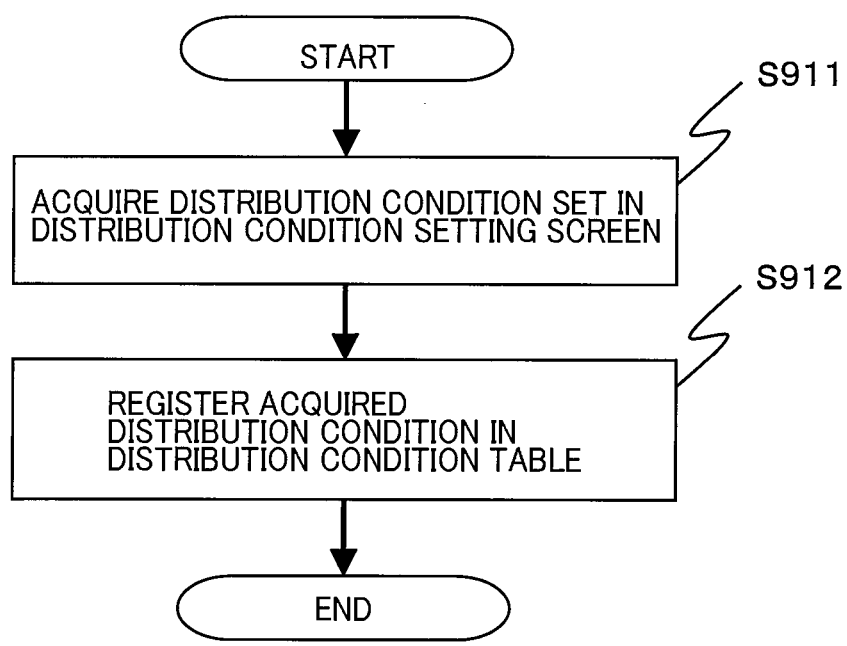
FIG. 9 is a flowchart for explaining a distribution condition setting process S900.

FIG. 9 is a flowchart for explaining the process performed by the distribution condition setting unit 316 (hereafter referred to as distribution condition setting process S900). An explanation of the distribution condition setting process S900 with reference to FIG. 9 follows. The distribution condition setting process S900 is activated at the moment a predetermined operational input by the user is performed to the storage management client 103 for setting the distribution condition.

Figure 10:
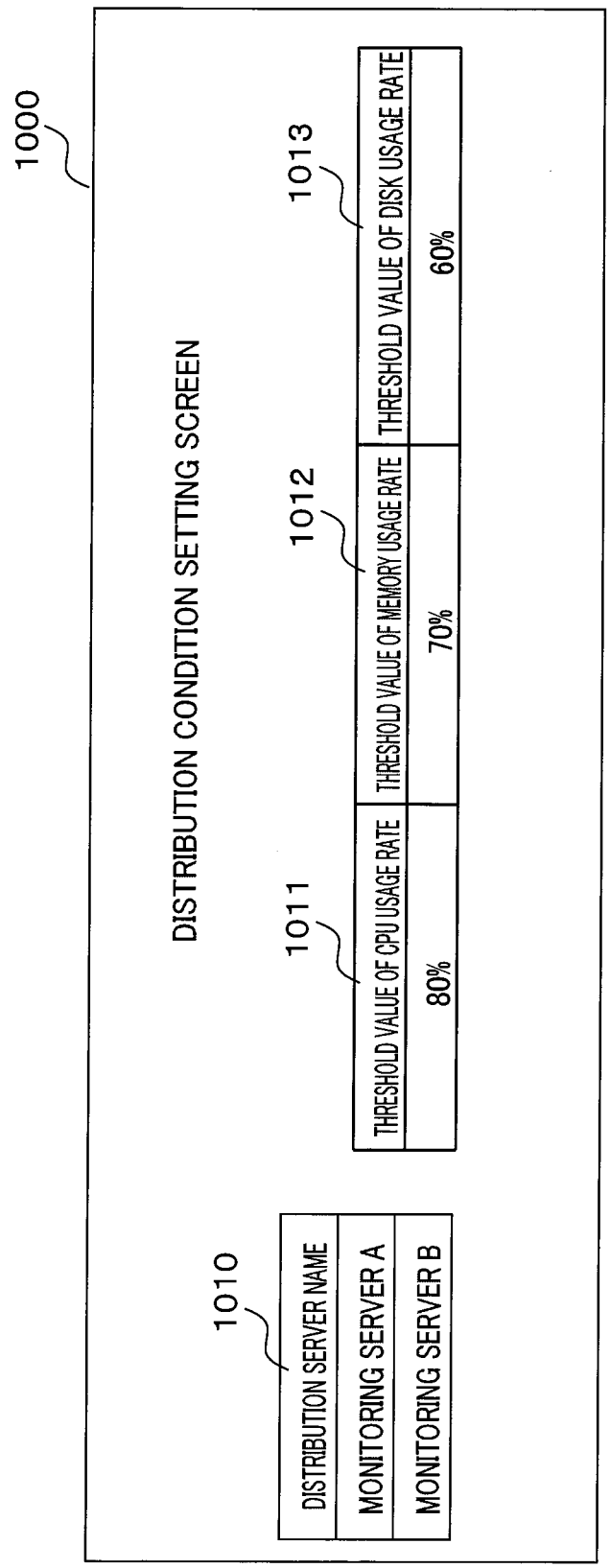
FIG. 10 is an example of a distribution condition setting screen 1000.

At S911, the distribution condition setting unit 316 acquires the distribution condition set by a user operating on the display screen shown in FIG. 10 (hereafter referred to as distribution condition setting screen 1000). Then, at S912, the distribution condition setting unit 316 registers the acquired distribution condition in the distribution condition table 313.

An example of a distribution condition table 313 is shown in FIG. 11. As shown in FIG. 11, the distribution condition table 313 has registered therein the threshold value of the CPU usage rate 3131, the threshold value of the memory usage rate 3132, the threshold value of the disk usage rate 3133, and the distribution server name 3134 (information that identifies the storage monitoring server 119 capable of being responsible for managing the performance information and the monitoring information). (The user can specify the storage monitoring server 119 that is the distribution target.)

Figure 12:
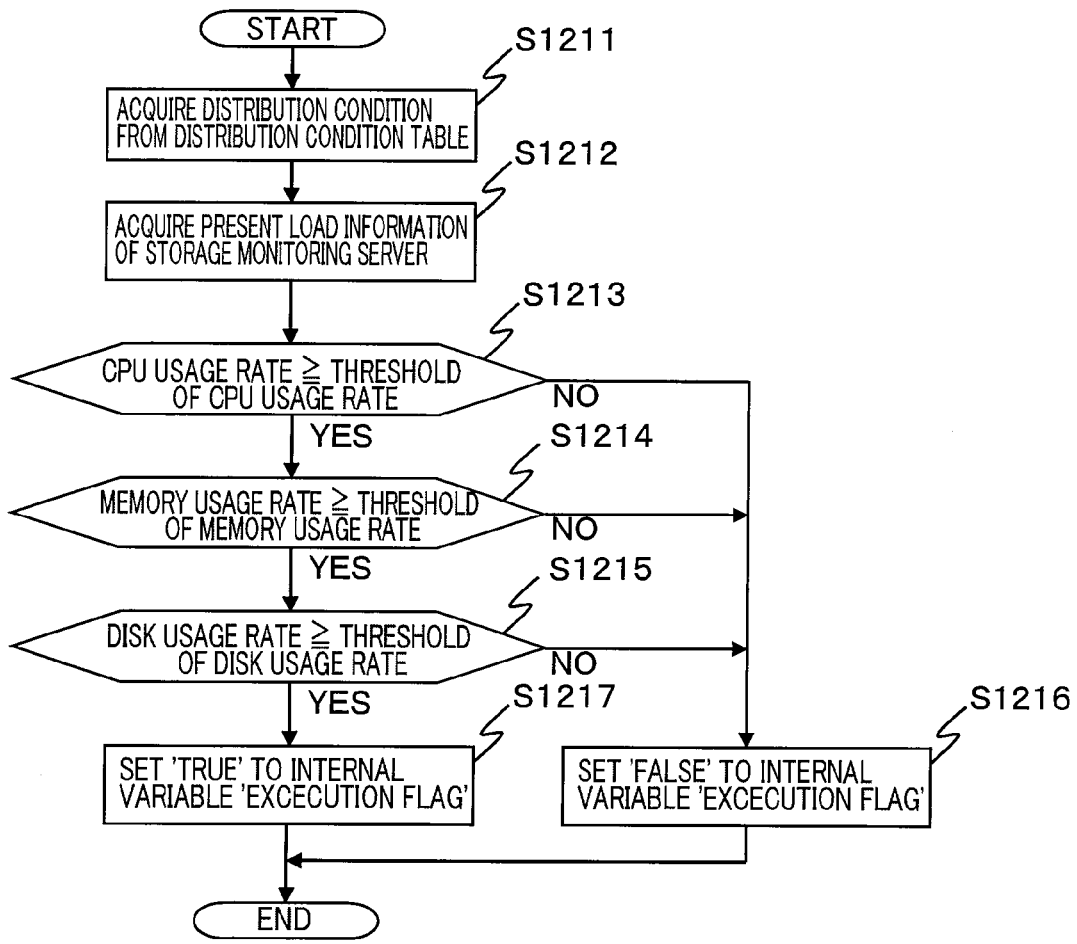
FIG. 12 is a flowchart for explaining a distribution plan generation determination process S1200.

FIG. 12 is a flowchart for explaining a process performed by the distribution plan generation determination unit 307 (hereinafter referred to as distribution plan generation determination process S1200). An explanation of the distribution plan generation determination process S1200 will be given with reference to FIG. 12. The distribution plan generation determination process S1200 is activated at a predetermined timing (scheduled timing, periodical timing, and the like).

First, the distribution plan generation determination unit 307 acquires the threshold value of the CPU usage rate 3131, the threshold value of the memory usage rate 3132, and the threshold value of the disk usage rate 3133 of the distribution condition table 313 (S1211). These become threshold values for determining the load on the storage monitoring server 119.

Then, the distribution plan generation determination unit 307 acquires, as current load information on the storage monitoring server 119, the current CPU usage rate of the storage monitoring server 119, the current disk usage rate of the storage monitoring server 119, and the current memory usage rate of the storage monitoring server 119 (S1212). The information can be directly acquired from the storage monitoring server 119, or by the agent information collector 301 as performance information and then acquiring the value stored in the performance information table 303.

Next, the distribution plan generation determination unit 307 determines whether or not the load of the storage monitoring server 119 has exceeded the threshold value. Starting at S1213, the distribution plan generation determination unit 307 determines whether or not the current CPU usage rate of the storage monitoring server 119 equals or exceeds the CPU usage rate threshold value S131 acquired at S1211. If the current CPU usage rate equals or exceeds the threshold value (S1213: YES), the process proceeds to S1214. If the current CPU usage rate is less than the threshold value (S1213: NO), the process proceeds to S1216.

The distribution plan generation determination unit 307 then determines whether or not the current memory usage rate of the storage monitoring server 119 equals or exceeds the memory usage rate threshold value 3132 acquired at S1211 (S1214). If the current memory usage rate equals or exceeds the threshold value (S1214: YES), the process proceeds to S1215, and if it is less than the threshold value (S1214: NO), the process proceeds to S1216.

Next, the distribution plan generation determination unit 307 determines whether or not the current disk usage rate of the storage monitoring server 119 equals or exceeds the disk usage rate threshold value 3133 acquired at S1211 (S1215). If the current disk usage rate equals or exceeds the threshold value (S1215: YES), the process proceeds to S1217, and if it is less than the threshold value (S1215: NO), the process proceeds to S1216.

At S1216, the distribution plan generation determination unit 307 sets 'FALSE' to 'Execution Flag' that is an internal variable. At S1217, the distribution plan generation determination unit 307 sets 'TRUE' to an internal variable 'Execution Flag'.

In the above manner, the storage monitoring server 119 determines whether or not the distribution condition is satisfied and generates a distribution plan when the distribution condition is satisfied. Therefore, an unnecessary distribution plan is not generated whereas a distribution plan is reliably generated when needed, thereby allowing the storage monitoring server 119 to operate efficiently and the appropriate load distribution among the storage monitoring servers 119 to be implemented reliably.

Figure 13:
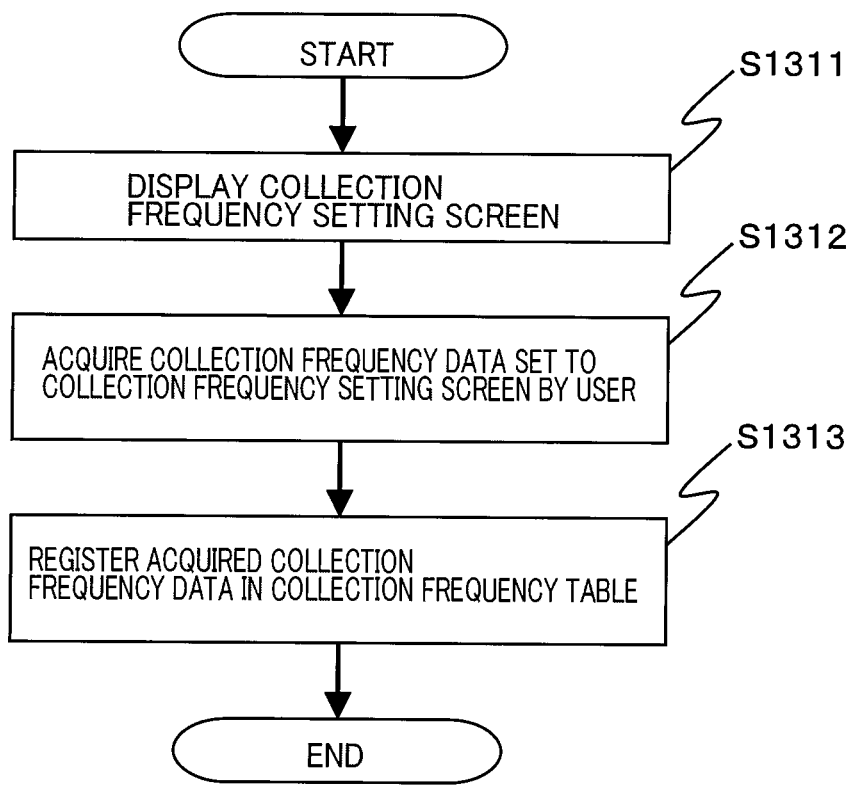
FIG. 13 is a flowchart for explaining a collection frequency setting process S1300.

FIG. 13 is a flowchart for explaining the process performed by the collection frequency setting unit 315 (hereinafter referred to as collection frequency setting process S1300). In the following description, an explanation of the collection frequency setting process S1300 will be given with reference to FIG. 13. The collection frequency setting process S1300 is, for example, activated at the moment a certain operational input by the user is performed to the storage management client 103 for setting the collection frequency.

Figures 14, 15:
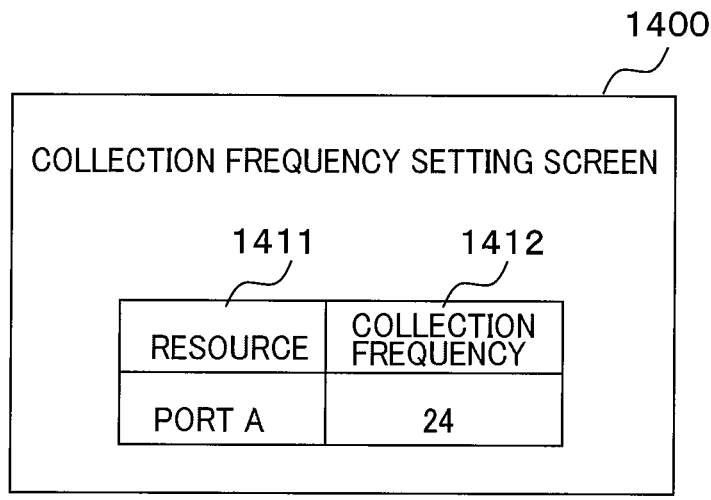
FIG. 14 is an example of a collection frequency setting screen 1400.
FIG. 15 is an example of a collection frequency table 304.

At S1311, the collection frequency setting unit 315 displays, according to an operational input by the user, a collection frequency setting screen 1400 shown in FIG. 14 to the storage management client 103. As shown in FIG. 14, a resource display column 1411 and a collection frequency display column 1412 are provided to the collection frequency setting screen 1400. The collection frequency setting unit 315 displays in the resource display column 1411 of the collection frequency setting screen 1400 resources that can be acquired from the path table 305 (contents of resource 3052 of path table 305).

At S1312, the collection frequency setting unit 315 acquires the collection frequency data of the resource set in the collection frequency setting screen 1400 by the user. Then, the collection frequency setting unit 315 registers the acquired collection frequency data (S1313). An example of the collection frequency table 304 is shown in FIG. 15.

Figure 16:
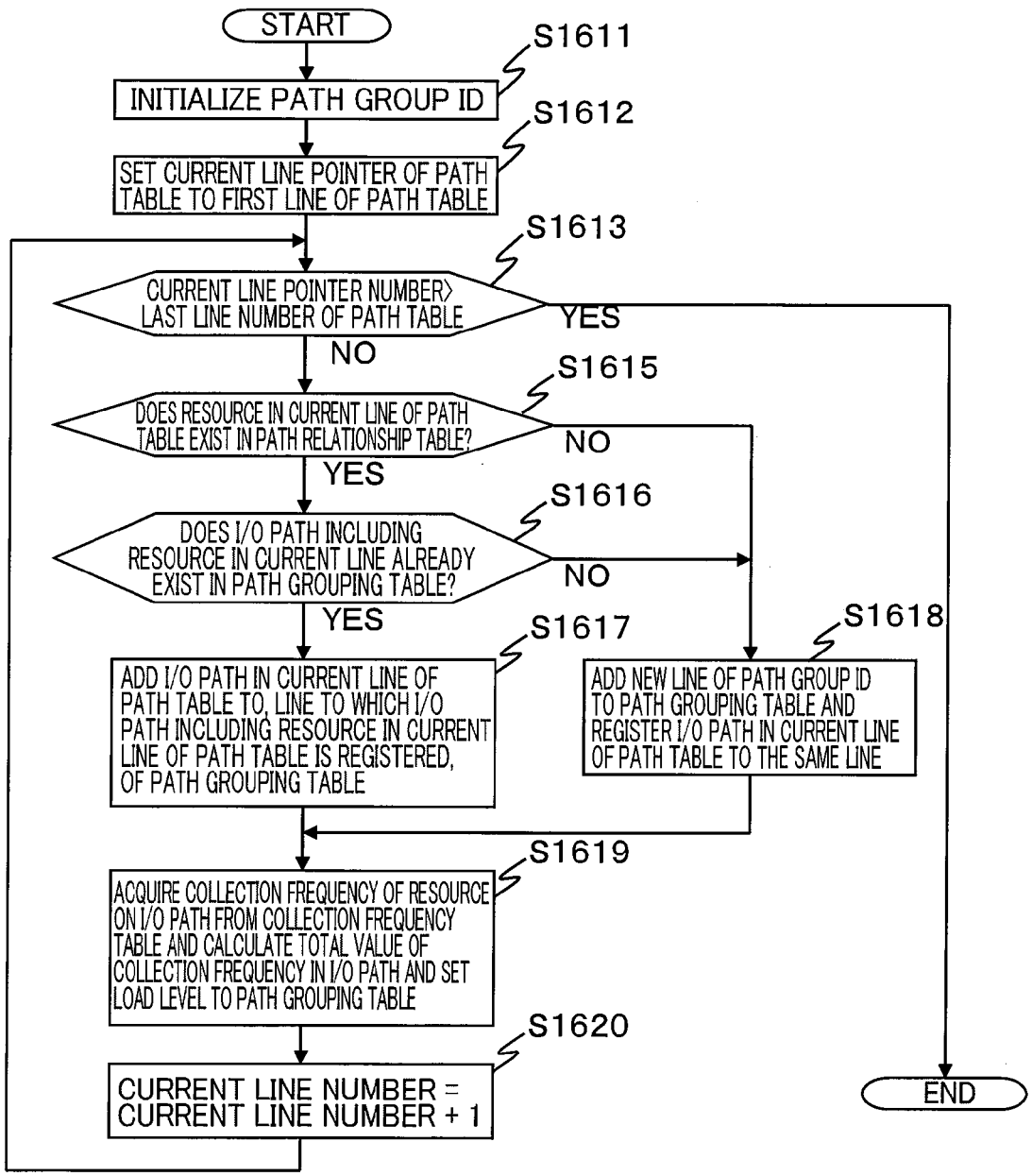
FIG. 16 is a flowchart for explaining a path grouping process S1600.

FIG. 16 is a flowchart for explaining the process performed by the path grouping unit 309 (hereinafter referred to as path grouping process S1600). In the following description, an explanation of the path grouping process S1600 will be given with reference to FIG. 16. The path grouping process S1600 is, for example, executed following the above-mentioned information acquisition process S700 performed by the agent information collector 301.

First, the path grouping unit 309 initializes the path group ID, which is an internal variable (set, for example, to 1) (S1611). The path grouping unit 309 also sets the value of the current line pointer that indicates the current line in the path table 305 to the first line (S1612).

At S1613, the path grouping unit 309 determines whether or not the current line pointer number exceeds the last line number in the path table 305. If the current line pointer number exceeds the last line number in the path table 305 (S1613: YES) the process terminates. If the current line pointer number does not exceed the last line number in the path table 305 (S1613: NO) the process proceeds to S1615.

At S1615, the path grouping unit 309 determines whether or not the resource of the current line in the path table 305 is registered in the path relation table 306. If the resource of the current line in the path table 305 is registered in the path relation table 306 (S1615: YES) the process proceeds to S1616, and if not (S1615: NO), the process proceeds to S1618.

At S1616, the path grouping unit 309 determines whether or not the I/O path including the resource of the current line in the path table 305 is already registered in the path grouping table 310.

FIG. 17 shows an example of a path grouping table 310. As shown in FIG. 17, the path grouping table 310 is composed of one or more records including a group ID 3101 to which a group ID that is an identifier given to each I/O path group is set, an I/O path 3102 to which the identifier of the I/O path belonging to the group is set, and a load level 3103 to which the load level (described later) of the group is set.

At S1616, when the I/O path including the resource of the current line in the path table 305 is already registered in the path grouping table 310 (S1616: YES) the process proceeds to S1617, and when it is not registered (S1616: NO) the process proceeds to S1618.

At S1617, the path grouping unit 309 adds the I/O path of the current line in the path grouping table 305 to the line in the path grouping table 310 to which the I/O path including the resource of the current line in the path grouping table 305 is registered.

At S1618, the path grouping unit 309 adds a line of a new path group ID to the path grouping table 310 (for example, a value incremented by the current path group ID) and registers the I/O path of the current line in the path table 305 therein.

In the following S1619, the path grouping unit 309 acquires the collection frequency of the resource on the I/O path from the collection frequency table 304 to calculate the total value of the collection frequency of the I/O path and sets the calculated value to the load level 3103 of the path grouping table 310. Thereafter, the current line number is incremented (current line number=current line number+1) (S1620) and the process returns to S1613.

Figure 18:
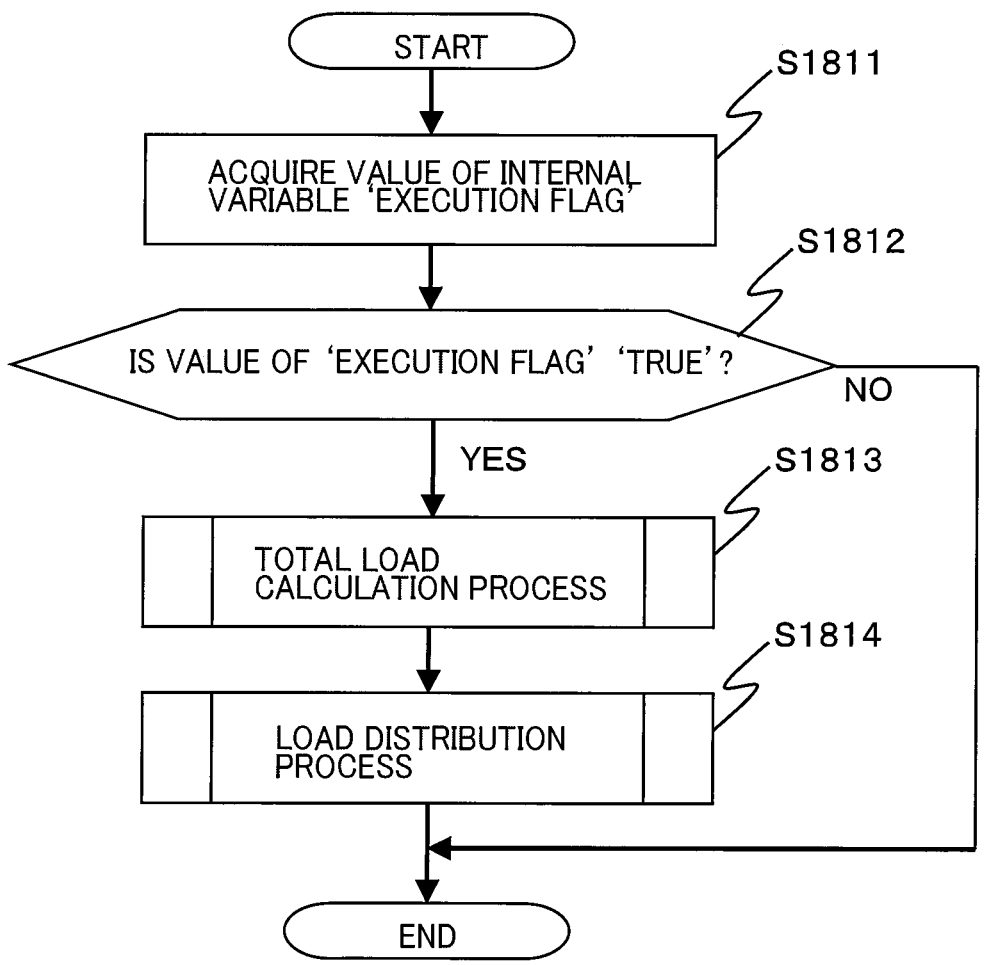
FIG. 18 is a flowchart for explaining a distribution plan generation process S1800.

FIG. 18 is a flowchart for explaining the process performed at the distribution plan generator 308 (hereafter referred to as distribution plan generation process S1800). In the following description, an explanation of the distribution plan generation process S1800 will be given with reference to FIG. 18. The distribution plan generation process S1800 is activated, for example, at a predetermined timing (scheduled timing, periodical timing, or the like) or at a timing when the content of the collection frequency table 304 is changed by the collection frequency setting unit 315.

The distribution plan generator 308 acquires a value of the internal variable 'execution flag' (S1811) and determines whether or not the value is 'TRUE' (S1812). When the value of the internal variable 'execution flag' is 'TRUE' (S1812: YES) the process proceeds to S1813 and the distribution plan generator 308 executes a later-described total load calculation process S1813 and a load distribution process S1814. When the value of the internal variable 'execution flag' is not 'TRUE' (is 'FALSE') (S1812: NO) the process terminates.

Figure 19:
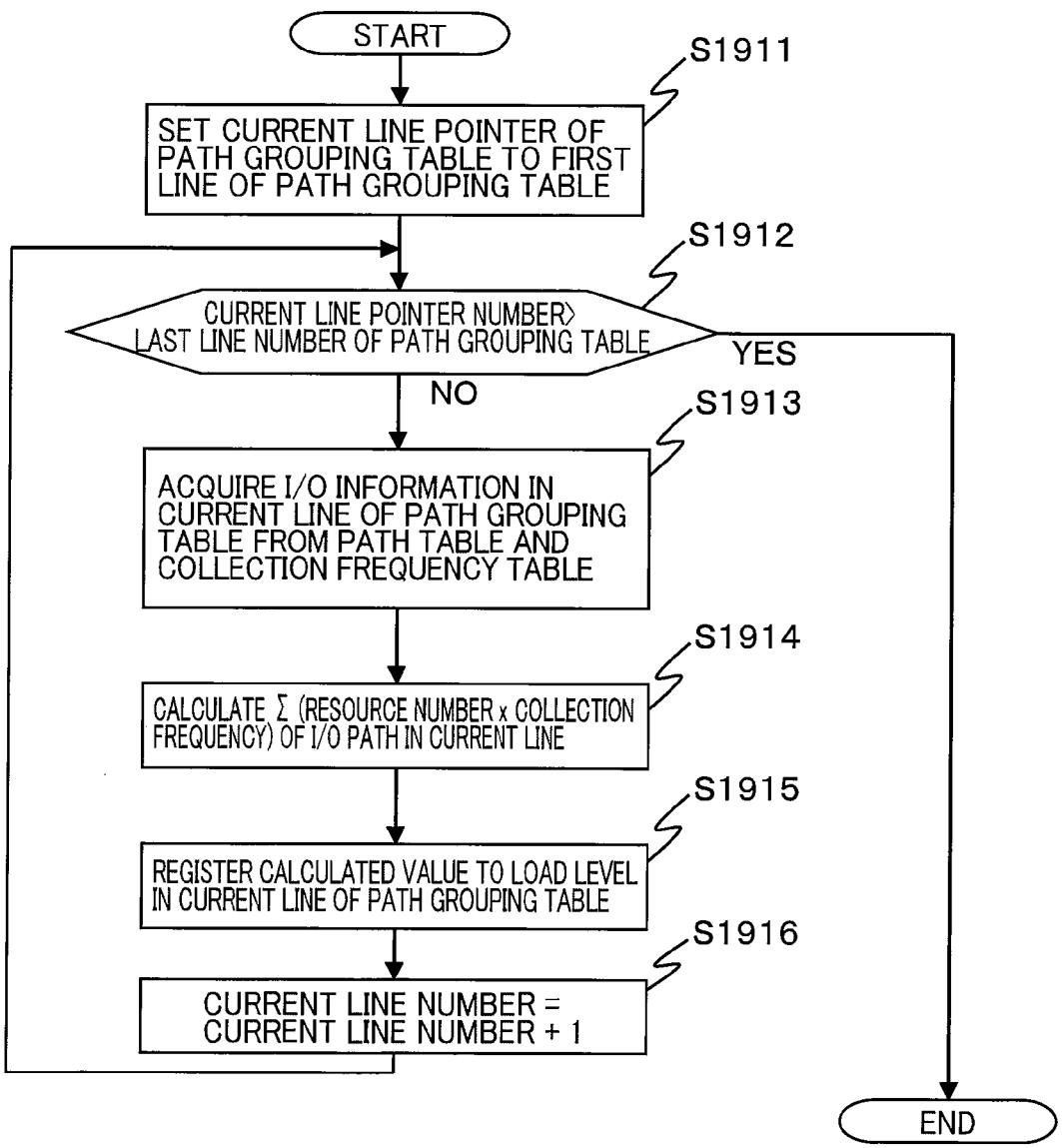
FIG. 19 is a flowchart for explaining a total load calculation process S1813.

FIG. 19 is a flowchart for explaining the total load calculation process S1813 in the distribution plan generation process S1800.

First, the distribution plan generator 308 sets the value of the current line pointer in the path grouping table 309 to the first line in path grouping table 310 (S1911).

At S1912, the distribution plan generator 308 determines whether or not the value of the current line pointer exceeds the last line number of the path grouping table 310. If the value of the current line pointer exceeds the last line number of the path grouping table (S1912: YES) the process terminates, and if not (S1912: NO) the process proceeds to S1913.

At S1913, the distribution plan generator 308 acquires information relating to the I/O path of the current line in the path grouping table 310 from the path table 305 and the collection frequency table 304 (S1913).

Next, the distribution plan generator 308 calculates the total value of the collection frequency of the resources configuring the I/O path of the current line in the path grouping table 310 (=Σ(number of resources×collection frequency)) (S1914). Then, the distribution plan generator 308 registers the calculated total value to the load level 3103 of the I/O path of the current line in the path grouping table 310 (S1915). Thereafter, the current line number is incremented (current line=current line+1) (S1916) and the process returns to S1912.

Figure 20:
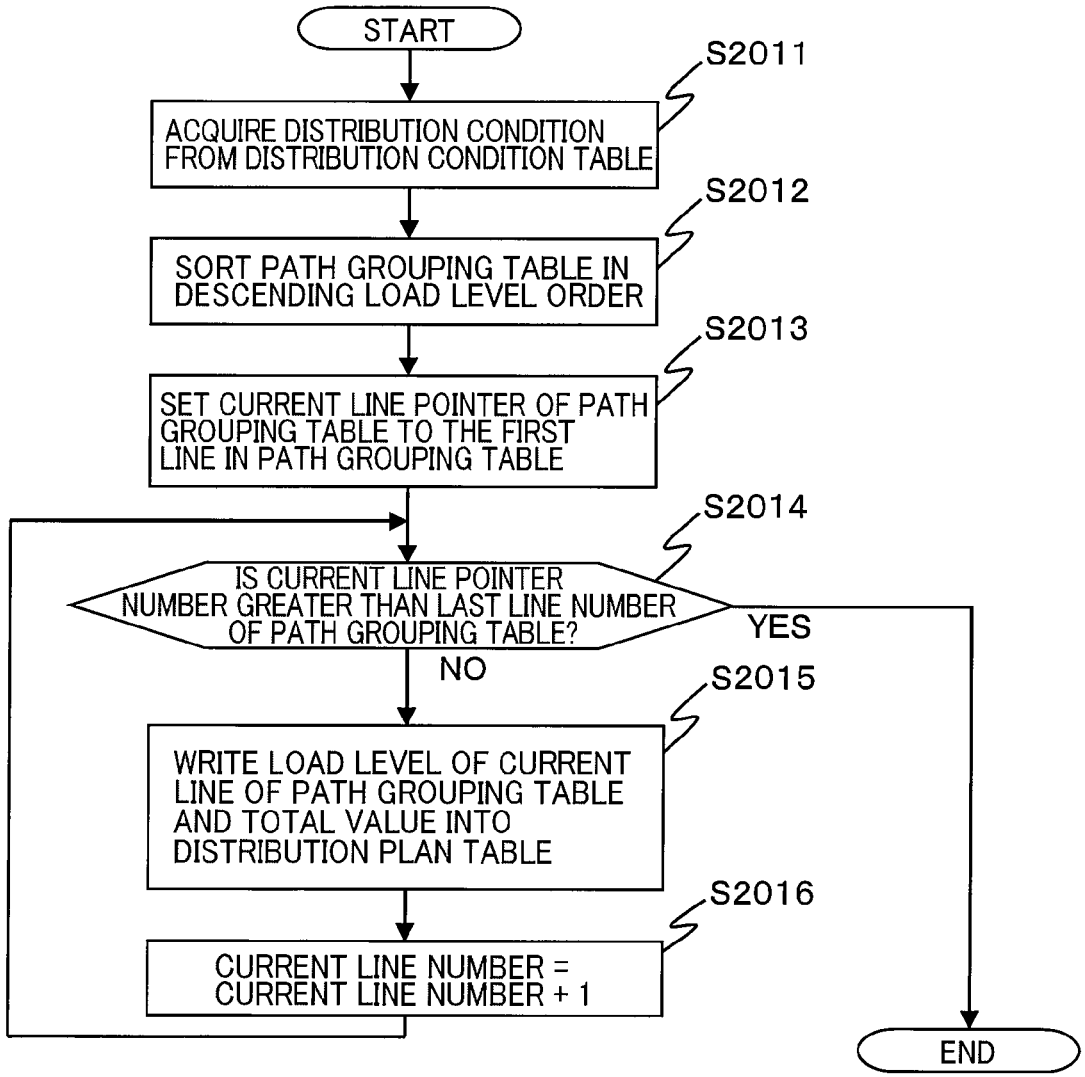
FIG. 20 is a flowchart for explaining a load distribution process S1814.

FIG. 20 is a flowchart for explaining the load distribution process S1814 at the distribution plan generation process S1800.

First, the distribution plan generator 308 acquires the contents set in the distribution condition table 313 from the distribution condition table 313 (S2011). The distribution plan generator 308 also sorts the records in the path grouping table 310 in descending load level 3103 order (S2012). Then, the distribution plan generator 308 sets the value of the current line pointer in the path grouping table 310 to the first line in the path grouping table 310 (S2013).

At S2014, the distribution plan generator 308 determines whether or not the value of the current line pointer exceeds the last line number in the path grouping table 310. When the value of the current line pointer exceeds the last line number in the path grouping table 310 (S2014: YES) the process terminates, and when it does not (S2014: NO), the process proceeds to S2015.

At the following S2015, the distribution plan generator 308 reflects the contents of the current line in the path grouping table 310 in the distribution plan table 312.

FIG. 21 shows an example of a distribution plan table 312. As shown in FIG. 21, the distribution plan table 312 is configured with one or more records having a group ID 3121, a load level 3122, and distribution destination monitoring server 3123. The distribution plan table 312 manages therein information indicating how processes to be performed by the storage monitoring servers 119 are to be distributed (divided) among a plurality of storage monitoring servers 119 (storage monitoring servers 119 capable of being responsible for a process) in units of groups (the method of distribution).

FIG. 21 shows a case in which there is registered a distribution plan in which the storage monitoring server 119 with an identifier 'monitoring server A' being responsible for the process on an I/O path belonging to a path group with group ID 3121 '1' and the storage monitoring server 119 with an identifier 'monitoring server B' being responsible for the process on an I/O path belonging to path groups with group ID 3121 '2' and '3'.

The reflection of the contents of the current line in the path grouping table 310 in the distribution plan table 312, in S2015 of FIG. 20, is specifically performed as follows. That is, the distribution plan generator 308 adds the group ID of the current line in the path grouping table 310 to the group ID 3121 with the smallest load level 3122 value in the distribution plan table 312. Also, the distribution plan generator 308 adds the load level 3103 value of the current line in the path grouping table 310 to the current load level 3122 value of the distribution plan table 312.

The configuration of the distribution plan is not limited to those explained above. For example, processing can be distributed among the storage monitoring servers 119 so that the total load value of each group is strictly equalized. Alternatively, processing may be assigned with priority given to the storage monitoring server 119 with a low load level. The distribution plan can utilize a variety of other load distribution methods and optimization techniques according to conventional techniques.

At S2016, the distribution plan generator 308 increments the current line number (current line number=current line number+1). Thereafter, the process returns to S2014.

Figure 22:
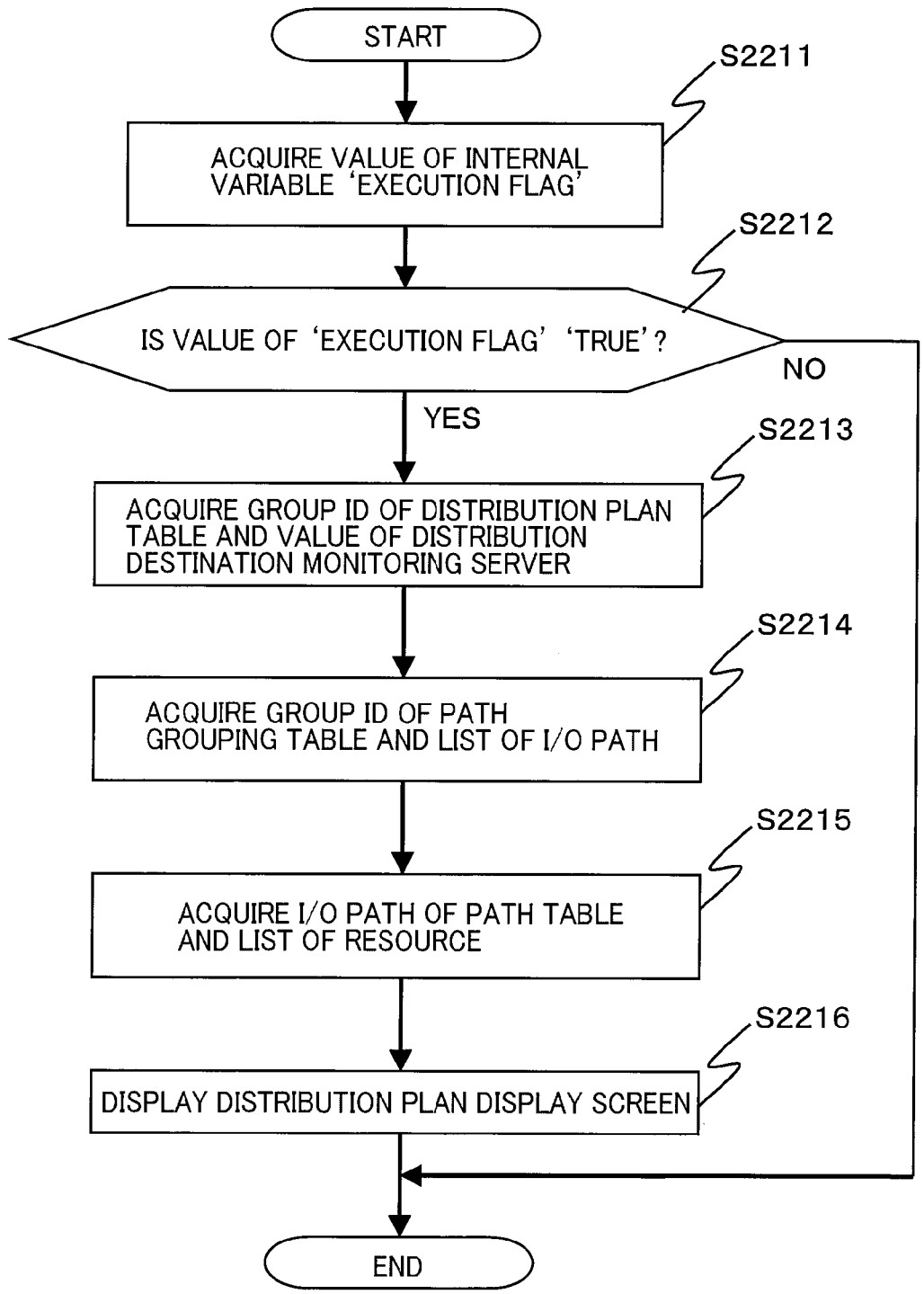
FIG. 22 is a flowchart for explaining a distribution plan display process S2200.

FIG. 22 is a flowchart for explaining the process implemented by the distribution plan display unit 317 (hereafter referred to as distribution plan display process S2200). In the following description, an explanation of the distribution plan display process S2200 will be given with reference to FIG. 22. For example, the distribution plan display process S2200 is executed following the process of the distribution plan generator 308. The distribution plan generation process S2200 is activated at a predetermined timing (scheduled timing, periodical timing, or the like).

First, the distribution plan display unit 317 acquires the value of the internal variable 'execution flag' (S2211) to determine whether or not the value is 'TRUE' (S2212). When the value of the internal variable 'execution flag' is 'TRUE' (S2212: YES) the process proceeds to S2213. When the value of the internal variable 'execution flag' is not 'TRUE' (is 'FALSE') (S2212: NO) the process terminates.

At S2213, the distribution plan display unit 317 acquires a combination of values of the group ID 3121 and the distribution destination monitoring server 3123 from the distribution plan table 312. The distribution plan display unit 317 also acquires a combination of values of the group ID 3101 and the I/O path 3102 from the path grouping table 310 (S2214). Further, the distribution plan display unit 317 acquires a combination of values of the I/O path 3051 and the resource 3052 from the path table 305 (S2215).

At the following S2216, the distribution plan display unit 317 outputs to the storage management client 103 a screen with information acquired at S2213-S2215 recorded (hereafter referred to as distribution plan display screen). FIG. 23 shows an example of a distribution plan display screen 2300 displayed by the storage management client 103. As shown in FIG. 23, the distribution plan display screen 2300 includes a distribution destination monitoring server entry 2311, an I/O path group 2312 entry, an I/O path entry 2313, and a resource entry 2314. Additionally, as shown in FIG. 23, the distribution plan display screen 2300 has an execution button 2315 for the user to instruct the application of the distribution plan displayed on the distribution plan display screen 2300.

Figure 24:
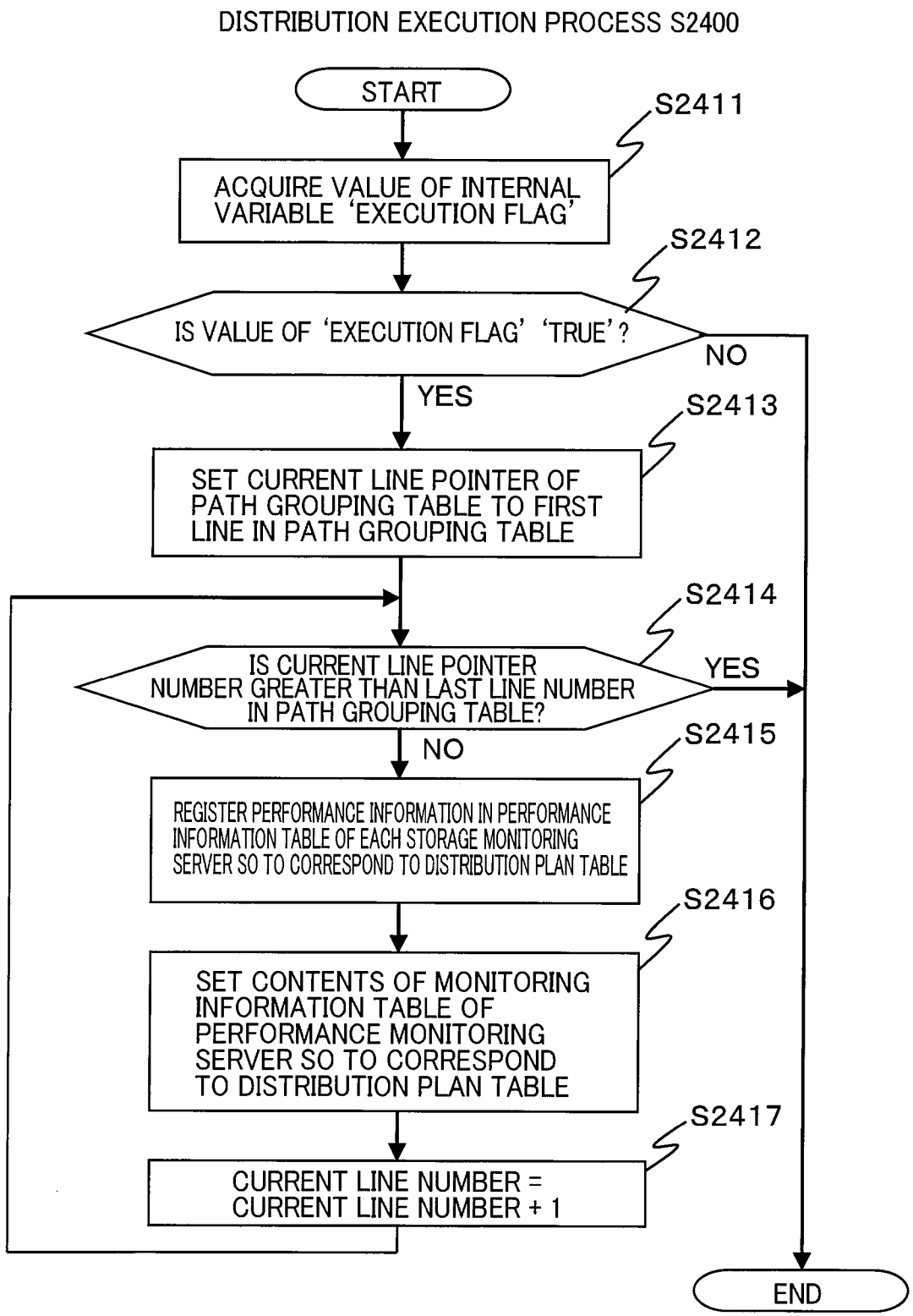
FIG. 24 is a flowchart for explaining a distribution execution process S2400.

FIG. 24 is a flowchart for explaining the process implemented by the distribution executing unit 311 (hereafter referred to as distribution execution process S2400). In the following description, an explanation of the distribution execution process S2400 will be given with reference to FIG. 24. The distribution execution process S2400 is activated when the execution button 2315 on the distribution plan display screen 2300 is operated.

First, the distribution executing unit 311 acquires the value of the internal variable 'execution flag' (S2411) to determine whether or not the value is 'TRUE' (S2412). When the value of the internal variable 'execution flag' is 'TRUE' (S2412: YES) the process proceeds to S2413. When the value of the internal variable 'execution flag' is not 'TRUE' (is 'FALSE') (S2412: NO) the process terminates.

At S2413, the distribution executing unit 311 sets the value of the current line pointer in the path grouping table 310 to the first line in the path grouping table 310.

At 2414, the distribution executing unit 311 determines whether or not the value of the current line pointer exceeds the last line number in the path grouping table 310. When the value of the current line pointer exceeds the last line number in the path grouping table (S2414: YES) the process terminates, and when it does not (S2414: NO) the process proceeds to S2415.

At S2415, in relation to the path group of the current line in the path grouping table 310, the distribution executing unit 311 transfers data between the storage monitoring servers 119 so as to correspond to the contents of the distribution plan table 312, and sets the contents of the performance information table 303 and the monitoring information table 302 of each storage monitoring server 119. The distribution executing unit 311 further sets the contents of the monitoring information table 318 to correspond to the contents of the distribution plan table 312 (S2416).

FIG. 25 shows an example of the monitoring information table 318. As shown in FIG. 25, the monitoring information table 318 is composed of one or more records having a setting entry of an identifier of the distribution destination storage monitoring server 119 (storage monitoring server 119 in charge of monitoring) 3181, a setting entry of an I/O path identifier 3182, a setting entry of a group ID 3183, and a setting entry of a resource 3184.

At S2147 of FIG. 24, the distribution executing unit 311 increments the current line number (current line number=current line number+1) and thereafter the process returns to S2414.

Performance Monitoring Server Processing

Figure 26:
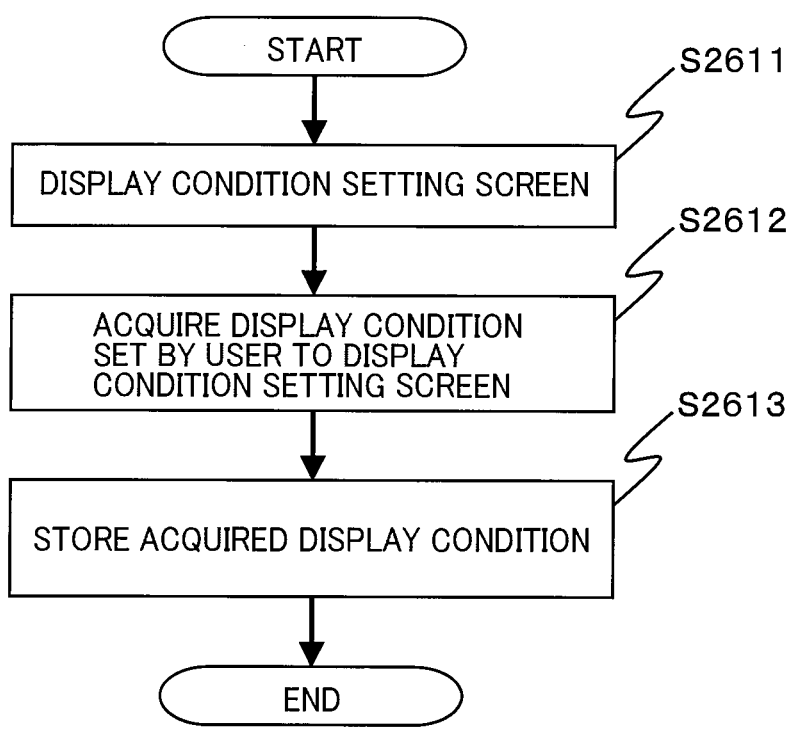
FIG. 26 is a flowchart for explaining a display condition setting process S2600.

FIG. 26 is a flowchart for explaining a process performed by the display condition setting unit 322 of the performance monitoring server 105 (hereafter referred to as display condition setting process S2600). The display condition setting process S2600 is activated, for example, at the moment a predetermined operational input by the user is performed to the storage management client 103 for setting the display condition.

First, the display condition setting unit 322 displays, in response to an operational input by a user, the display condition setting screen 2700 shown in FIG. 27 on the storage management client 103. As shown in FIG. 27, the display condition setting screen 2700 includes an item for setting a resource as a display target 2711, an item for setting the relevant resource or the resource coupled to the relevant resource (coupled resource) as a display target 2712, and an item for setting a coupled resource 2713.

At S2612, the display condition setting unit 322 acquires the display condition set by the user to the display condition setting screen 2700. The display condition setting unit 322 then stores the acquired display condition in the memory 52 or the storage device 53.

Figure 28:
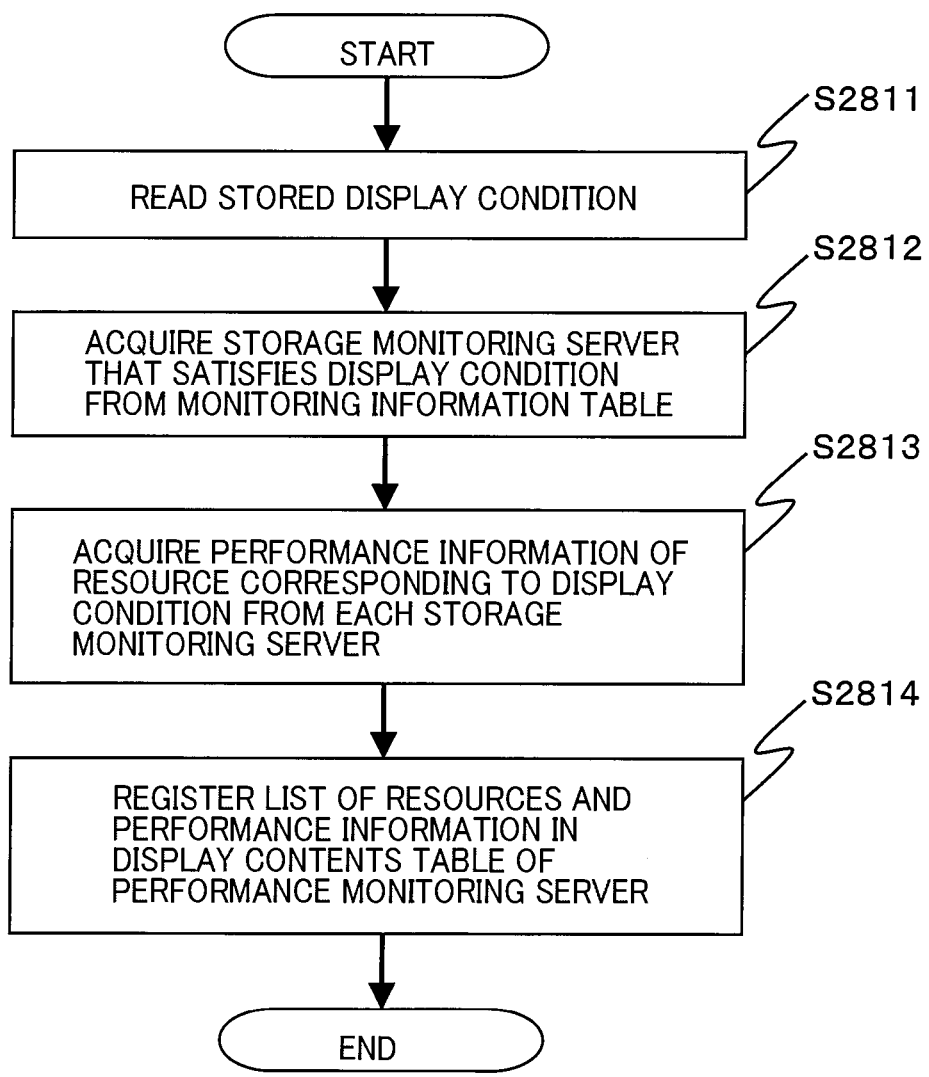
FIG. 28 is a flowchart for explaining a display contents generation process S2800.

FIG. 28 is a flowchart for explaining the process performed by the display contents generator 319 (hereafter referred to as display contents generating process S2800). The display contents generating process S2800 is, for example, activated following the above-mentioned display condition setting process S2600.

First, the display contents generator 319 reads out the display condition stored in the memory 52 or the storage device 53 (S2811) to acquire the storage monitoring server 119 that satisfies the display condition read from the monitoring information table 318 (S2812).

Figure 29:
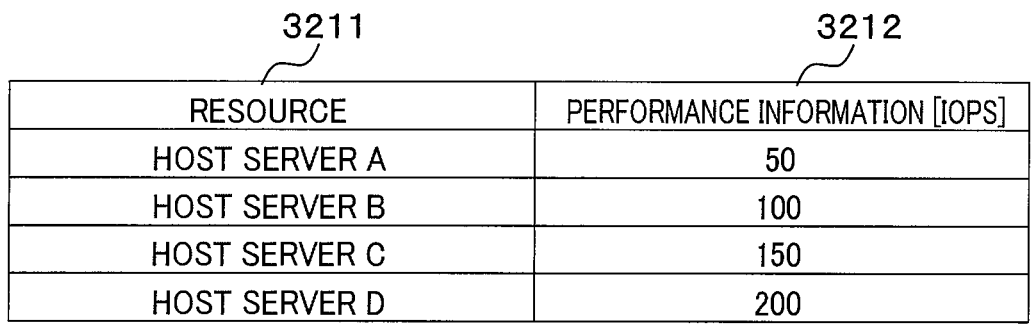
FIG. 29 is a diagram showing an example of a display contents table 321.

Next, the display contents generator 319 acquires from each storage monitoring server 119 performance information of the resource corresponding to the display condition (S2813) and outputs the acquired performance information to the display contents table 321 shown in FIG. 29 (S2814). As shown in FIG. 29, the display contents table 321 is composed of one or more records including an item to which a resource identifier is set 3211 and an item to which performance information of a resource is set 3212.

Figure 30:
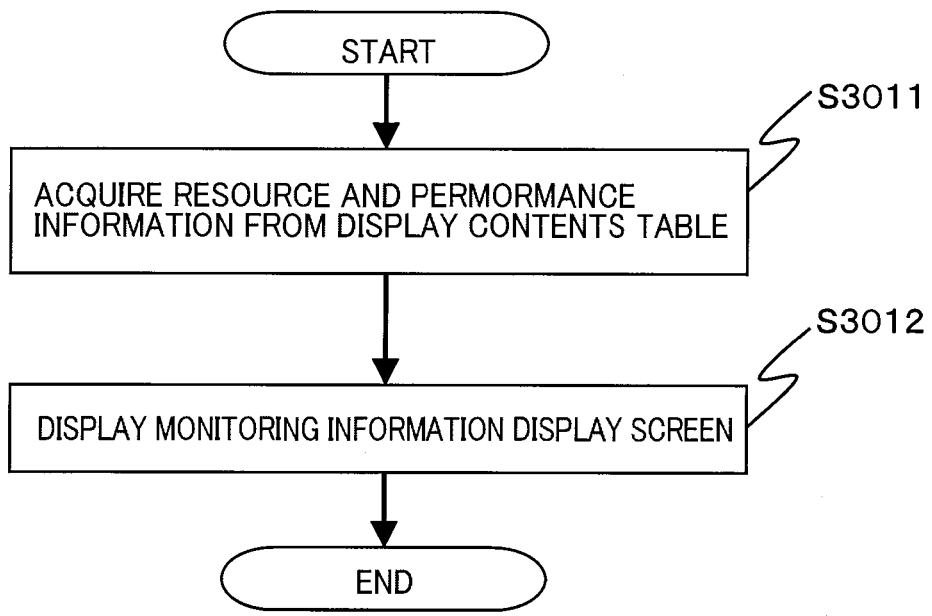
FIG. 30 is a flowchart for explaining a monitoring information display process S3000.

FIG. 30 is a flowchart for explaining the process performed by the monitoring information display unit 323 (hereafter referred to as monitoring information display process S3000). The monitoring information display process S3000 is activated, for example, following the above-mentioned display contents generation process S2800.

Figure 31:
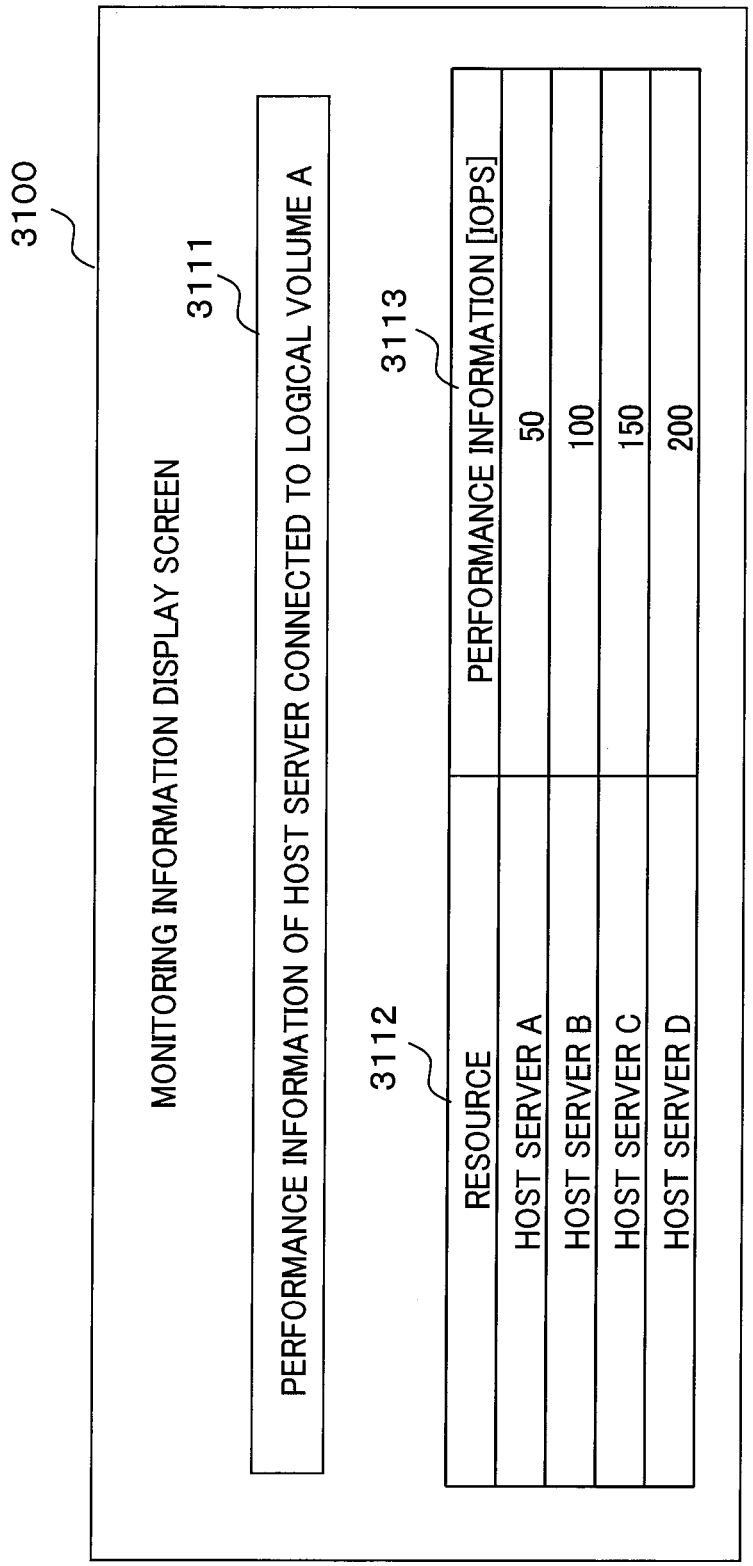
FIG. 31 is an example of a monitoring information display screen 3100.

First, the monitoring information display unit 323 acquires resource and performance information from the display contents table 321 (S3011). Then, the monitoring information display unit 323 outputs the monitoring information display screen 3100, shown in FIG. 31, having recorded thereon acquired resource and performance information to display on the storage management client 103 (S3012). As shown in FIG. 31, the monitoring information display screen 3100 includes an entry for displaying an explanation of the display content 3111, a display entry for a resource identifier 3112, and a display entry for performance information 3113.

As described above, the storage monitoring server 119 determines the storage monitoring server 119 to be responsible for managing individual performance information and individual monitoring information based on acquired performance information and monitoring information, and automatically transfers individual performance information and individual monitoring information to the storage monitoring servers 119 in charge of the management thereof. Therefore, the performance information and monitoring information to be managed by each of the plurality of storage monitoring servers 119 can be appropriately distributed according to performance information and monitoring information. Thus, appropriate load distribution among individual storage monitoring servers 119 can be carried out.

The storage monitoring server 119 also classifies similar I/O paths into a same group and decides the storage monitoring server 119 to be responsible for managing individual performance information and individual monitoring information in units of the groups. Thus, the individual storage monitoring servers 119 are made responsible for managing similar performance information and monitoring information so that the management of performance information and monitoring information after being distributed to the plurality of storage monitoring servers 119 does not become complicated. Thus, the load on management can be minimized, such that the relationship between resources as monitoring targets on the I/O path can be easily understood.

The storage monitoring server 119 also manages the load on managing the performance information and monitoring information of the I/O path belonging to each group and decides which storage monitoring server 119 is to be responsible for managing individual performance information and individual monitoring information so that the load on each storage monitoring server 119 is equalized. Therefore, load distribution among the storage monitoring servers 119 can be reliably carried out.

It is to be understood that the foregoing description is provided in order to facilitate an understanding of the present invention, and is not to limit the scope of the invention. The present invention encompasses various modifications, improvements, and equivalents without departing from the scope and spirit of the present invention.

What is claimed is:

1. An information processing system including a plurality of storage monitoring servers communicatively coupled to each other and being configured to manage performance information related to performance in a storage system that includes a storage apparatus and a host server that accesses the storage apparatus, and to monitor information to be monitored in the storage system, the monitoring information including therein information indicative of a configuration of I/O paths in the storage system and I/O path-related information indicating whether or not the I/O paths are similar, the storage monitoring servers each comprising at least one computer comprising:

an information collecting unit configured to acquire the performance information and the monitoring information from the storage system;

a path grouping unit configured to determine a similarity of the I/O paths based on the I/O path-related information and to classify the I/O paths determined to be similar into a same group;

a distribution plan generator configured to determine the storage monitoring server to be responsible for managing individual performance information and individual monitoring information based on the performance information and the monitoring information acquired, the distribution plan generator determining the storage monitoring server to be responsible for managing the individual performance information and the individual monitoring information in units of the groups classified by the path grouping unit; and a distribution execution unit configured to transfer the individual performance information and the individual monitoring information to the storage monitoring server responsible for managing the individual performance information and the individual monitoring information according to a distribution plan determined by the distribution plan generator.

2. The information processing system according to claim 1, wherein the I/O path-related information includes at least one of information relating to an application configured to access the storage apparatus using the I/O paths, information relating to a cluster of a host server configured to access the storage apparatus using the I/O paths, information relating to a virtual machine of a host server configured to access the storage apparatus using the I/O paths, information relating to a device file of a host server configured to access the storage apparatus using the I/O paths, information relating to a migration function between storage apparatuses coupled to the paths, and information relating to an externally coupled storage apparatus of a storage apparatus coupled to the I/O paths.

3. The information processing system according to claim 1, wherein the storage monitoring server is configured to manage, for each of the groups, loads on management of the performance information and the monitoring information of an I/O path belonging to each group, and the distribution plan generator is configured to determine the storage monitoring server that is responsible for managing the individual performance information and the individual monitoring information so that the load on each of the storage monitoring servers is equalized.

4. The information processing system according to claim 3, wherein the storage monitoring server further includes a collection frequency setting unit configured to receive and to store a setting of collection frequency of the performance information and the monitoring information on each resource of the storage server, and the distribution plan generator is configured to determine the load on each of the storage monitoring servers based on the collection frequency so that the load on each of the storage monitoring servers is equalized and to determine the storage monitoring server to be responsible for managing the individual performance information and the individual monitoring information.

5. The information processing system according to claim 1, wherein the storage monitoring server further includes a distribution condition setting unit configured to receive a distribution condition that is a condition for determining whether or not the distribution plan is to be generated, and a distribution plan generation determination unit configured to determine whether or not the distribution plan is to be generated according to the distribution plan received, and the distribution plan generator is configured to generate the distribution plan when the distribution plan generation determination unit decides to generate the distribution plan.

6. The information processing system according to claim 5, wherein the distribution condition includes a threshold value for determining a current load on the storage monitoring server.

7. The information processing system according to claim 1, wherein the distribution plan generator is configured to store information that specifies storage monitoring servers capable of being responsible for managing the performance information and the monitoring information and to determine the storage monitoring server to be responsible for managing the individual performance information and the individual monitoring information so that the storage monitoring server specified by the information is made responsible for managing the performance information and the monitoring information.

8. A storage monitoring server management method in an information processing system including a plurality of storage monitoring servers comprising at least one computer communicatively coupled to each other and being configured to manage performance information related to performance in a storage system that includes a storage apparatus and a host server configured to access the storage apparatus and to monitor information to be monitored in the storage system, the monitoring information including therein information indicative of a configuration of I/O paths in the storage system and I/O path-related information indicating whether or not the I/O paths are similar;

the method comprising:

acquiring, using at least one of the storage monitor servers, the performance information and the monitoring information from the storage system;

determining, using the at least one of the storage monitor servers, a similarity of the I/O paths based on the I/O path-related information and classifying, using the at least one of the storage monitor servers, the I/O paths determined by a path grouping unit to be similar into a same group;

determining, using the at least one of the storage monitor servers, the storage monitoring server to be responsible for managing individual performance information and individual monitoring information based on the performance information and the monitoring information acquired;

determining, using the at least one of the storage monitor servers, the storage monitoring server to be responsible for managing the individual performance information and the individual monitoring information in units of the classified groups; and transferring, using the at least one of the storage monitor servers, the individual performance information and the individual monitoring information to the storage monitoring server responsible for managing respective information according to a distribution plan determined by the storage monitoring server.

9. The storage monitoring server management method according to claim 8, wherein the I/O path-related information includes at least one of
- information related to an application configured to access the storage apparatus using the I/O paths,
- information related to a cluster of a host server configured to access the storage apparatus using the I/O paths,
- information related to a virtual machine of a host server configured to access the storage apparatus using the I/O paths,
- information related to a device file of a host server configured to access the storage apparatus using the I/O paths,
- information related to a migration function between storage apparatuses coupled to the I/O paths,
- information related to an externally coupled storage apparatus of a storage apparatus coupled to the I/O paths, and
- information that specifies an application that uses the I/O paths.

10. The storage monitoring server management method according to claim 8, wherein the method further comprising:
- managing, using the at least one of the storage monitoring servers, for each of the groups, a load on management of the performance information and the monitoring information of an I/O path belonging to each group; and
- determining, using the at least one of the storage monitoring servers, the storage monitoring server responsible for managing the individual performance information and the individual monitoring information so that the load on each of the storage monitoring servers is equalized.

11. The storage monitoring server management method according to claim 10, the method further comprising:
- receiving and storing, using the at least one of the storage monitoring servers, a setting of a collection frequency of the performance information and the monitoring information for individual resources of the storage server; and
- determining, using the at least one of the storage monitoring servers, the load on each of the storage monitoring servers based on the collection frequency and determining, using the at least one of the storage monitoring servers, the storage monitoring servers responsible for managing the individual performance information and the individual monitoring information so that the load on each of the storage monitoring servers is equalized.

12. The storage monitoring server management method according to claim 8, the method further comprising:
- receiving, using the at least one of the storage monitoring servers, a distribution condition that is a condition for determining whether or not the distribution plan is to be generated;
- determining, using the at least one of the storage monitoring servers, whether or not the distribution plan is to be generated according to the distribution condition received; and
- generating, using the at least one of the storage monitoring servers, the distribution plan when the distribution plan generation determination unit decides to generate the distribution plan.

13. The storage monitoring server management method according to claim 12, wherein the distribution condition includes a threshold value for determining a current load on the storage monitoring server.

14. The storage monitoring server management method according to claim 8, the method further comprising:
- storing, using the at least one of the storage monitoring servers, information that specifies storage monitoring servers capable of being responsible for managing the performance information and the monitoring information; and
- determining, using the at least one of the storage monitoring servers, the storage monitoring server to be responsible for managing the individual performance information and the individual monitoring information so that the storage monitoring server specified by the information is made responsible for managing the performance information and the monitoring information.

* * * * *

UNITED STATES PATENT AND TRADEMARK OFFICE
CERTIFICATE OF CORRECTION

| | | |
|---|---|---|
| PATENT NO. | : 8,843,613 B2 | Page 1 of 1 |
| APPLICATION NO. | : 12/642547 | |
| DATED | : September 23, 2014 | |
| INVENTOR(S) | : Ozaki et al. | |

It is certified that error appears in the above-identified patent and that said Letters Patent is hereby corrected as shown below:

On the title page item (30)

Insert the following:

--(30)   Foreign Application Priority Data

Oct. 26, 2009   (JP)   2009-245753--

Signed and Sealed this
Thirty-first Day of March, 2015

Michelle K. Lee
*Director of the United States Patent and Trademark Office*